(12) United States Patent
Keum et al.

(10) Patent No.: US 12,523,882 B2
(45) Date of Patent: Jan. 13, 2026

(54) REFLECTIVE STRUCTURE, REFLECTIVE STRUCTURE ARRAY COMPRISING SAME, AND FLOATING IMAGE DISPLAY DEVICE

(71) Applicant: SAMSUNG ELECTRONICS CO., LTD., Suwon-si (KR)

(72) Inventors: Changmin Keum, Suwon-si (KR); Myungho Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 396 days.

(21) Appl. No.: 17/987,431

(22) Filed: Nov. 15, 2022

(65) Prior Publication Data
US 2023/0074490 A1 Mar. 9, 2023

Related U.S. Application Data

(63) Continuation of application No. PCT/KR2021/006055, filed on May 14, 2021.

(30) Foreign Application Priority Data

May 15, 2020 (KR) .................. 10-2020-0058332
Sep. 25, 2020 (KR) .................. 10-2020-0125091

(51) Int. Cl.
*G02B 30/56* (2020.01)
*G02B 5/09* (2006.01)
*G02B 5/04* (2006.01)

(52) U.S. Cl.
CPC .............. *G02B 30/56* (2020.01); *G02B 5/09* (2013.01); *G02B 5/045* (2013.01)

(58) Field of Classification Search
CPC ........... G02B 30/56; G02B 5/09; G02B 5/045

USPC ......................................................... 359/629
See application file for complete search history.

(56) References Cited

U.S. PATENT DOCUMENTS

| | | | |
|---|---|---|---|
| 7,965,448 B2 | 6/2011 | Maekawa | |
| 8,123,370 B2 | 2/2012 | Maekawa | |
| 9,519,088 B2 | 12/2016 | Juni et al. | |
| 9,638,843 B2 | 5/2017 | Katano et al. | |
| 9,991,473 B2 | 6/2018 | Chung et al. | |
| 10,193,035 B2 | 1/2019 | Diana et al. | |
| 10,901,122 B2 | 1/2021 | Watanabe et al. | |
| 2016/0018573 A1 | 1/2016 | Juni et al. | |

(Continued)

FOREIGN PATENT DOCUMENTS

| CN | 104160304 A | 11/2014 |
|---|---|---|
| CN | 107272248 A | 10/2017 |

(Continued)

OTHER PUBLICATIONS

International Search Report & Written Opinion (PCT/ISA/220, PCT/ISA/210, PCT/ISA/237) issued Aug. 23, 2021 by the International Searching Authority for International Application No. PCT/KR2021/006055.

(Continued)

*Primary Examiner* — William Choi
(74) *Attorney, Agent, or Firm* — Sughrue Mion, PLLC

(57) ABSTRACT

A reflective structure includes a substrate including a first surface and a second surface opposite to the first surface; a reflective pillar provided on the substrate; and a first light blocking layer covering the first surface of the substrate, wherein the first light blocking layer includes an opening adjacent to the reflective pillar and exposing a portion of the first surface of the substrate.

20 Claims, 27 Drawing Sheets

(56) References Cited

U.S. PATENT DOCUMENTS

| | | | |
|---|---|---|---|
| 2017/0285402 A1 | 10/2017 | Koito et al. | |
| 2018/0217395 A1 | 8/2018 | Lin et al. | |
| 2019/0179160 A1 | 6/2019 | Ito et al. | |
| 2019/0285904 A1 | 9/2019 | Kim et al. | |
| 2021/0041719 A1 | 2/2021 | Daiku | |
| 2021/0396914 A1 | 12/2021 | You et al. | |

FOREIGN PATENT DOCUMENTS

| | | |
|---|---|---|
| CN | 109917545 A | 6/2019 |
| JP | 5024712 B2 | 9/2012 |
| JP | 2017-142438 A | 8/2017 |
| JP | 2017-161733 A | 9/2017 |
| JP | 2017-173527 A | 9/2017 |
| JP | 2019-148702 A | 9/2019 |
| JP | 2019-191355 A | 10/2019 |
| KR | 10-2017-0060098 A | 5/2017 |
| KR | 10-2018-0095936 A | 8/2018 |
| KR | 10-2019-0052544 A | 5/2019 |
| KR | 10-2019-0107116 A | 9/2019 |
| WO | 2009/074919 A1 | 6/2009 |
| WO | 2017/196399 A1 | 11/2017 |
| WO | 2019/208097 A1 | 10/2019 |

OTHER PUBLICATIONS

Anonymous, "Ask a 3D", retrieved Nov. 15, 2022 from https://aska3d.com/en/, 4 pages total.

Aoto, et al., "A Design for Optical Cloaking Display", 2019, SIG Graph 2019, 28 pages total.

Yoshimizu et al., "Radially arranged dihedral corner reflector array for wide viewing angle of floating image without virtual image", 2019, Optics Express, vol. 27, No. 2, 10 pages total.

Miyazaki, et al., "Floating volumetric image formation using a dihedral corner reflector array device", 2013, Optical Society of America, vol. 52, No. 1, 10 pages total.

Anonymous, "About Parity Innovations", retrieved Nov. 15, 2022 from https://www.piq.co.jp/about_e.html, 3 pages total.

Yamaguchi, et al., "Fabrication of a Dihedral Corner Reflector Array for a Floating Image Manufactured by X-ray Lithography Using Synchrotron Radiation", 2015, Transactions of the Japan Institute of Electronics Pacaking, vol. 8, No. 1, 6 pages total.

Anonymous, "HUD Definition, Beginnings, Types, Future ", 2016, https://blog.naver.com/zooy3405, 11 pages total.

Seoung-Ryong, "[Let's find out] 'Head-up display' for high-tech vehicles", 2007, 3 pages total.

Communication issued on Oct. 5, 2023 by the European Patent Office in European Patent Application No. 21804428.7.

Communication dated Jun. 2, 2025, issued by Korean Intellectual Property Office in Korean Patent Application No. 10-2020-0125091.

Communication dated Jun. 28, 2025, issued by Chinese Patent Office in Chinese Patent Application No. 202180048108.6.

Communication dated Jun. 2, 2025, issued in European Patent Office in European Patent Application No. 21804428.7.

Communication dated Dec. 2, 2025, issued by the China National Intellectual Property Administration in Chinese Application No. 202180048108.6.

REFLECTIVE STRUCTURE, REFLECTIVE STRUCTURE ARRAY COMPRISING SAME, AND FLOATING IMAGE DISPLAY DEVICE

CROSS-REFERENCE TO RELATED APPLICATIONS

This application is a by-pass continuation application of International Application No. PCT/KR2021/006055, filed on May 14, 2021, which is based on and claims priority to Korean Patent Application No. 10-2020-0125091, filed on Sep. 25, 2020, and Korean Patent Application No. 10-2020-0058332, filed on May 15, 2020, in the Korean Intellectual Property Office, the disclosures of which are incorporated by reference herein in their entireties.

BACKGROUND

1. Field

The present disclosure relates to a reflective structure, a reflective structure array, and a floating image display device.

2. Description of Related Art

As the demand in the augmented reality (AR) and virtual reality (VR) markets is increasing and interest in public hygiene is increasing, the demand for mid-air display, which is an electronic device capable of non-contact interaction, is increasing.

Unlike normal mirrors, light incident from an original image (or object) passes through a dihedral corner reflector array (DCRA) device and is collected again on the opposite side of the DCRA. The DCRA may generate a floating image (mid-air image) by forming an image at a position exactly equal to the distance between the original image and the DCRA.

SUMMARY

Provided are a reflective structure, a reflective structure array, and a floating image display device having high light extraction efficiency.

Further, provided are a reflective structure, a reflective structure array, and a floating image display device, which do not generate a ghost image.

Further still, provided are a reflective structure array, and a floating image display device, which prevent direct image generation.

Additional aspects will be set forth in part in the description which follows and, in part, will be apparent from the description, or may be learned by practice of the presented embodiments.

According to an aspect of the disclosure, a reflective structure includes: a substrate including a first surface and a second surface opposite to the first surface; a reflective pillar provided on the substrate; and a first light blocking layer covering the first surface of the substrate, wherein the first light blocking layer includes an opening adjacent to the reflective pillar and exposing a portion of the first surface of the substrate.

The reflective pillar may include: a first reflective side surface; a second reflective side surface perpendicular to the first reflective side surface; and a front surface extending between the first reflective side surface and the second reflective side surface.

The front surface may be planar, and the reflective pillar has a triangular prism shape.

The reflective pillar may be provided on the first surface of the substrate, and the opening may be adjacent to the front surface.

The reflective structure may further include a second light blocking layer provided on an upper surface, the first reflective side surface, and the second reflective side surface of the reflective pillar.

The reflective structure may further include a second light blocking layer provided on an upper surface of the reflective pillar.

The reflective structure may further include a second light blocking layer provided between a bottom surface of the reflective pillar and the substrate.

An aspect ratio of the reflective pillar may be in a range of 0.6 to 3.5, and the aspect ratio of the reflective pillar may be determined by the following equation:

aspect ratio=(height of the reflective pillar)/(width of the first reflective side surface).

According to an aspect of the disclosure, a reflective structure array includes: a substrate; a plurality of reflective pillars provided on the substrate; and a first light blocking layer covering a first surface of the substrate, wherein the first light blocking layer includes a plurality of openings exposing the first surface, and each opening of the plurality of openings is adjacent to a corresponding reflective pillar of the plurality of reflective pillars, and wherein the plurality of reflective pillars and the plurality of openings immediately adjacent to each other are arranged in a first direction parallel to the first surface of the substrate.

A distance between adjacent reflective pillars of the plurality of reflective pillars may be equal to or less than twice a height of each of the plurality of reflective pillars.

Each of the plurality of reflective pillars may include: a first reflective side surface; a second reflective side surface perpendicular to the first reflective side surface; and a front surface extending between the first reflective side surface and the second reflective side surface, and a distance between the front surfaces of adjacent reflective pillars of the plurality of reflective pillars may be equal to or greater than 0.3 times a height of each of the plurality of reflective pillars.

The plurality of reflective pillars include a plurality of first reflective groups arranged in the first direction, and the plurality of first reflective groups each include a plurality of first reflective pillars arranged in a second direction parallel to the first surface and crossing the second direction.

The plurality of reflective pillars may be provided on the first surface of the substrate.

The front surface may be planar, and each reflective pillar of the plurality of reflective pillars has a triangular prism shape.

The plurality of reflective pillars may be provided on the first surface of the substrate, and each opening of the plurality of openings may be adjacent to the front surface of the corresponding reflective pillar of the plurality of reflective pillars.

The reflective structure array may further include a second light blocking layer provided on an upper surface, the first reflective side surface, and the second reflective side surface of each reflective pillar of the plurality of reflective pillars.

The reflective structure array may further include a second light blocking layer provided on an upper surface of each reflective pillar of the plurality of reflective pillars.

The reflective structure array may further include a second light blocking layer provided between a bottom surface of each reflective pillar of the plurality of reflective pillars and the substrate.

According to an aspect of the disclosure, a floating image display device includes: a real image element configured to output light that generates a real image; and a reflective structure array configured to generate a floating image by reflecting the light output from the real image element, wherein the reflective structure array includes: a substrate; a plurality of reflective pillars provided on the substrate; and a first light blocking layer covering a first surface of the substrate, the first light blocking layer including a plurality of first openings exposing the first surface, and each first opening of the plurality of first openings is adjacent to a corresponding reflective pillar of the plurality of reflective pillars, and wherein the plurality of reflective pillars and the plurality of first openings are arranged in a first direction parallel to the first surface.

Each of the plurality of reflective pillars may include: a first reflective side surface; a second reflective side surface perpendicular to the first reflective side surface; and a front surface extending between the first reflective side surface and the second reflective side surface.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
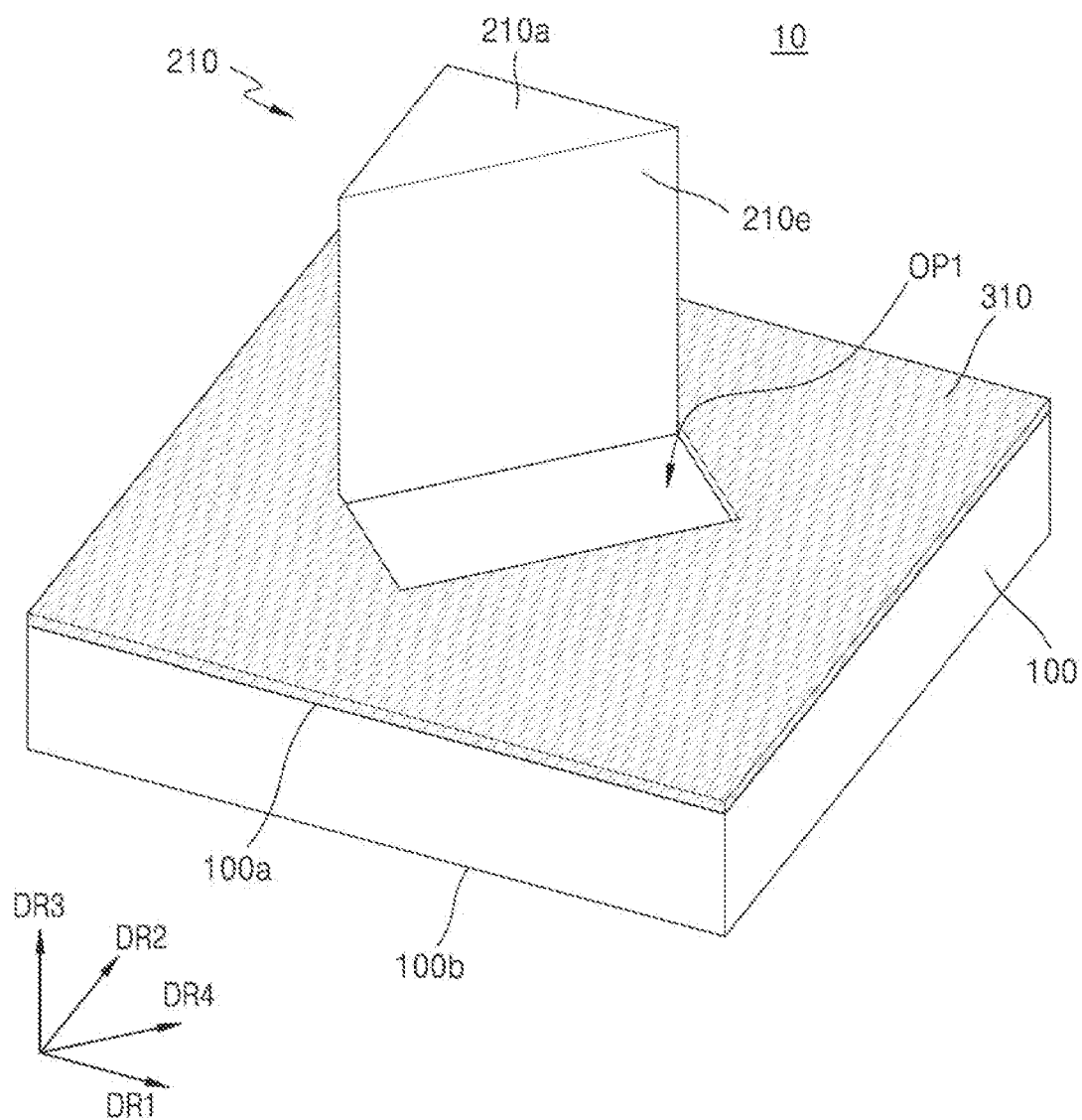
FIG. 1 is a perspective view of a reflective structure according to an example embodiment.

Hereinafter, embodiments of the present disclosure will be described in detail with reference to the accompanying drawings. In the following drawings, the same reference numerals denote the same elements, and the size of each element in the drawings may be exaggerated for clarity and convenience of explanation. Embodiments described herein are merely examples, and various modifications may be made thereto from these embodiments.

Hereinafter, the terms "above" or "on" may include not only those that are directly on in a contact manner, but also those that are above in a non-contact manner.

The singular forms "a," "an," and "the" as used herein are intended to include the plural forms as well unless the context clearly indicates otherwise. It will be understood that the terms "comprise," "include," or "have" as used herein specify the presence of stated elements, but do not preclude the presence or addition of one or more other elements.

Also, the terms such as " . . . er/or" described in the specification mean units that process at least one function or operation, and may be implemented as hardware, software, or a combination of hardware and software.

Figure 2:
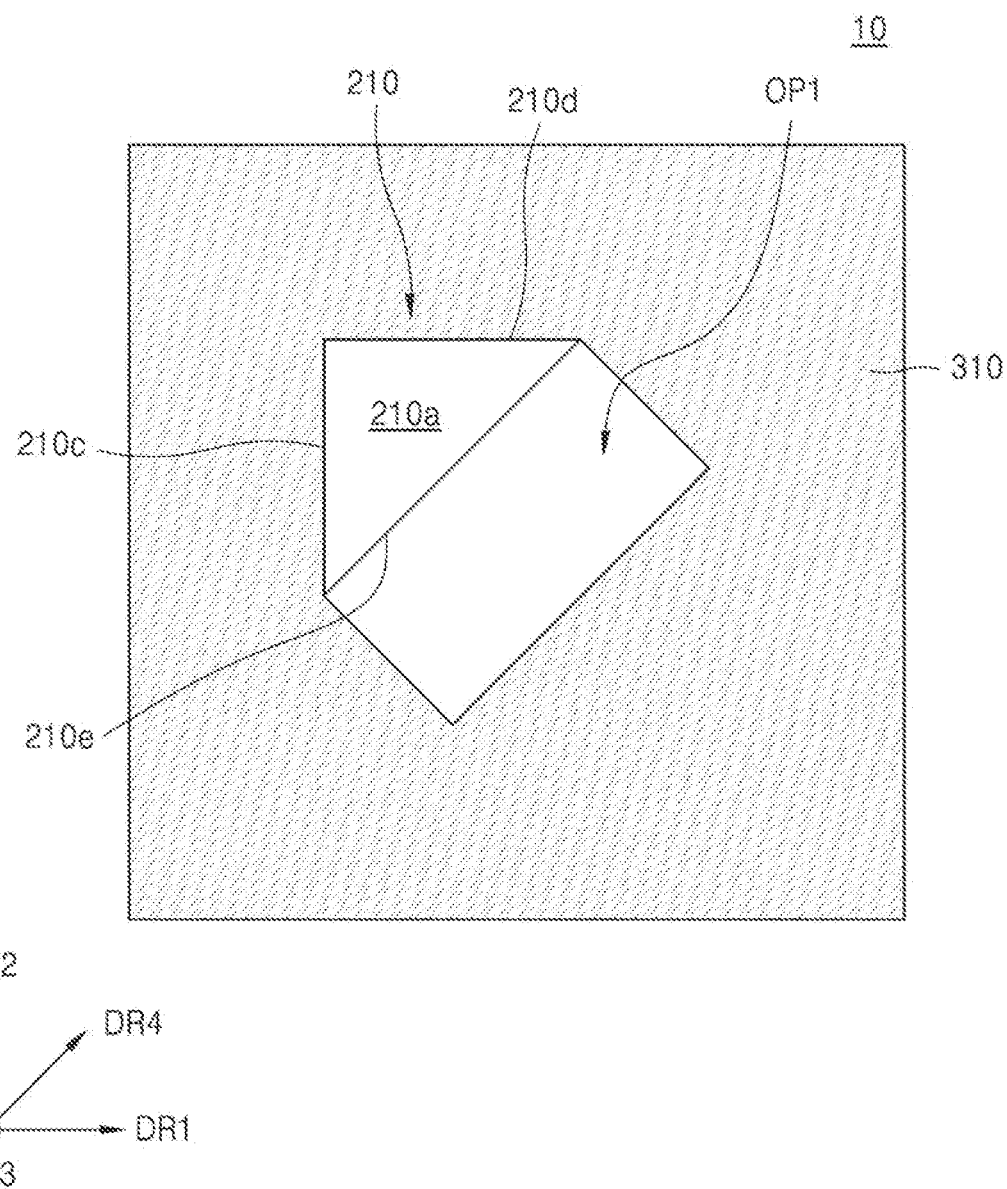
FIG. 2 is a plan view of the reflective structure of FIG. 1.
Figure 3:
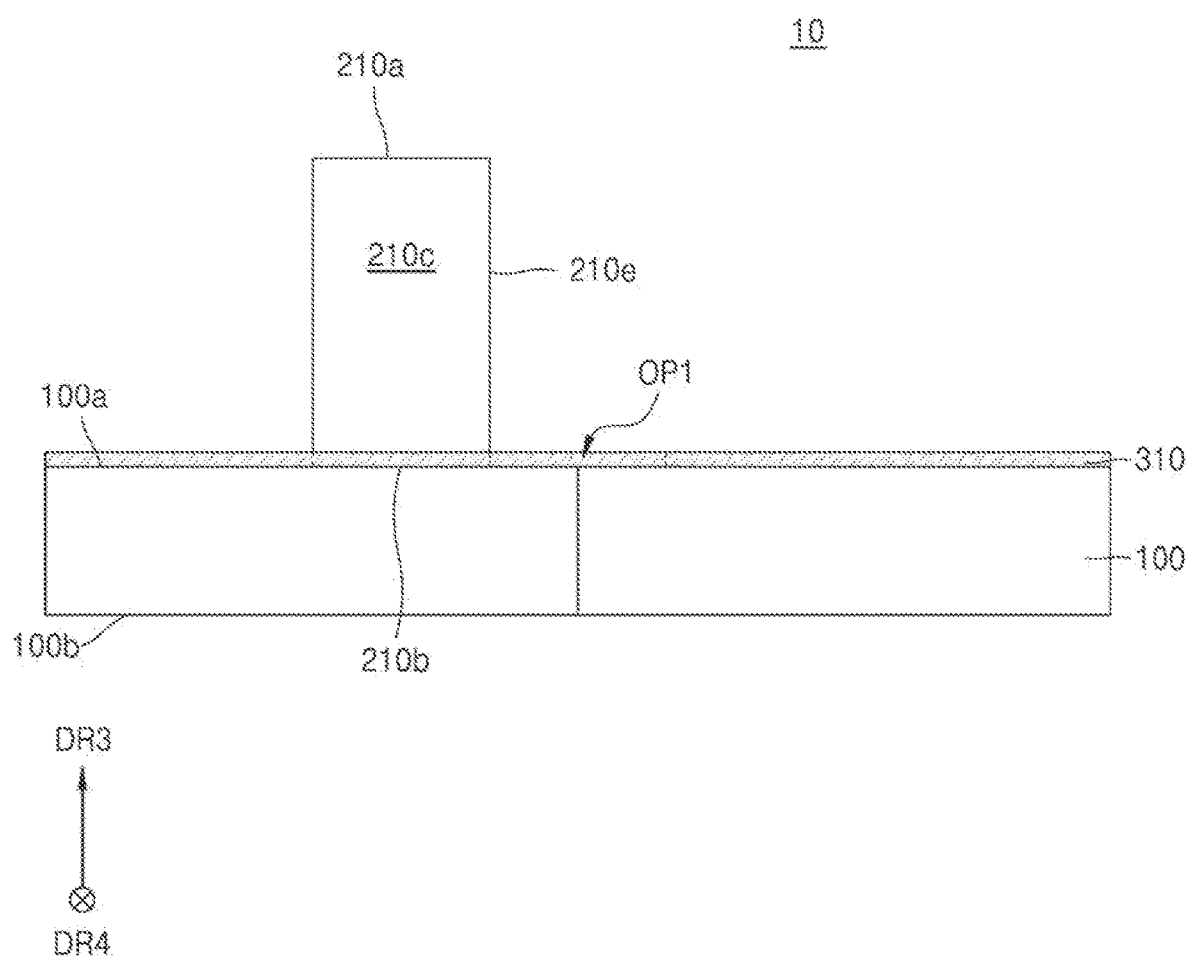
FIG. 3 is a side view of the reflective structure of FIG. 1.
Figure 4:
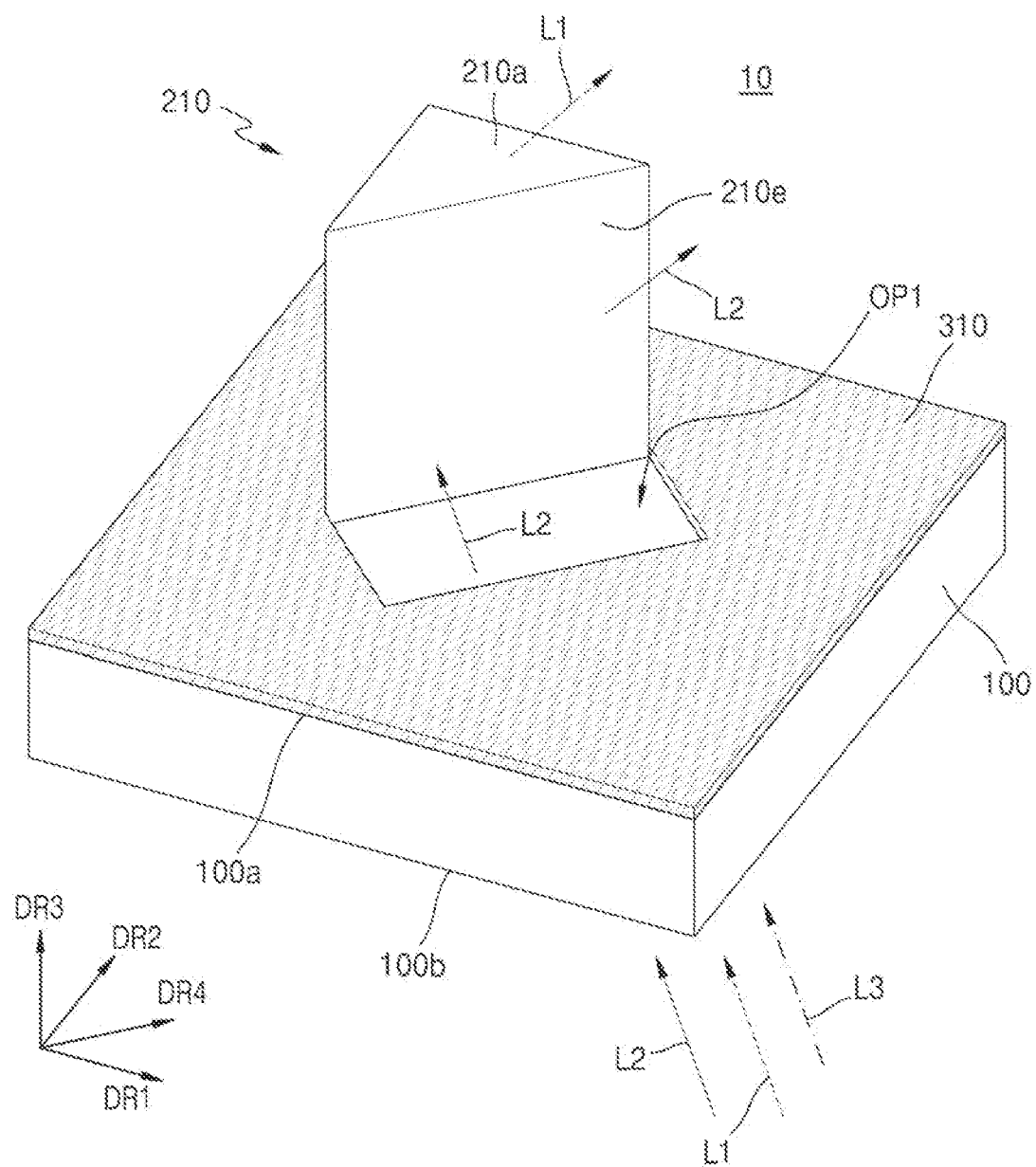
FIG. 4 is a diagram for describing a path of light incident on the reflective structure of FIG. 1.
Figure 5:
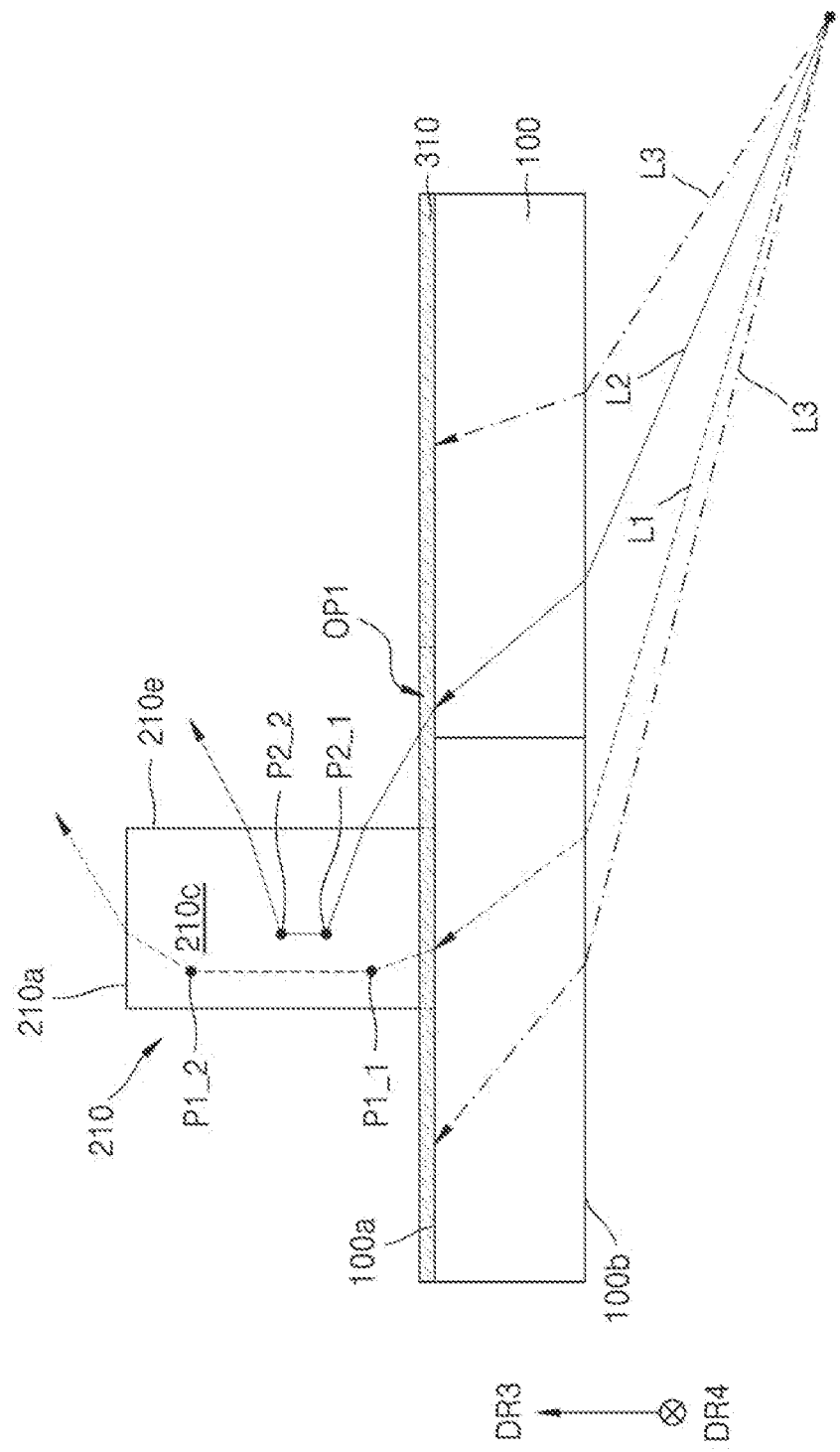
FIG. 5 is a side view of the reflective structure of FIG. 4.

FIG. 1 is a perspective view of a reflective structure according to an example embodiment. FIG. 2 is a plan view of the reflective structure of FIG. 1. FIG. 3 is a side view of the reflective structure of FIG. 1. FIG. 4 is a diagram for describing a path of light incident on the reflective structure of FIG. 1. FIG. 5 is a side view of the reflective structure of FIG. 4.

Referring to FIGS. 1, 2, and 3, a reflective structure 10 may be provided. The reflective structure 10 may include a substrate 100, a first light blocking layer 310, and a first reflective pillar 210. The substrate 100 may include a first surface 100*a* and a second surface 100*b* opposite to each other. For example, the first surface 100*a* and the second surface 100*b* may be parallel to each other. The first surface 100*a* may extend in a first direction DR1 and a second direction DR2, which cross each other. For example, the first direction DR1 and the second direction DR2 may be perpendicular to each other. The substrate 100 may include a transparent material. For example, the substrate 100 may include glass or transparent plastic. However, the material included in the substrate 100 is not limited to those described above.

The first reflective pillar 210 may be provided on the substrate 100. The first reflective pillar 210 may extend in a third direction DR3 crossing the first surface 100*a* of the substrate 100. For example, the third direction DR3 may be perpendicular to the first surface 100a. The first reflective pillar 210 may include an upper surface 210a, a bottom surface 210b, a first reflective side surface 210c, a second reflective side surface 210d, and a front surface 210e. The bottom surface 210b of the first reflective pillar 210 may be a surface facing the first surface 100a of the substrate 100. The upper surface 210a of the first reflective pillar 210 may be a surface opposite to the bottom surface 210b of the first reflective pillar 210. The first reflective side surface 210c, the second reflective side surface 210d, and the front surface 210e may be arranged between the upper surface 210a and the bottom surface 210b. The first reflective side surface 210c may be perpendicular to the second reflective side surface 210d. The front surface 210e may be arranged between the first reflective side surface 210c and the second reflective side surface 210d. The front surface 210e may extend from the edge of the first reflective side surface 210c disposed on the opposite side of the corner where the first reflective side surface 210c crosses the second reflective side surface 210d to the edge of the second reflective side surface 210d disposed on the opposite side of the corner where the first reflective side surface 210c crosses the second reflective side surface 210d. The front surface 210e may be flat. For example, the front surface 210e may extend in a fourth direction DR4 parallel to the edge where the front surface 210e crosses the first surface 100a of the substrate 100. The upper surface 210a and the bottom surface 210b of the first reflective pillar 210 may be triangular. The first reflective pillar 210 may be substantially a triangular pillar. The first reflective pillar 210 may be transparent. The first reflective pillar 210 may include a photoresist material. For example, the first reflective pillar 210 may include polymethylmethacrylate (PMMA) or SU-8. The aspect ratio of the first reflective pillar 210 may be 0.6 or more and 3.5 or less. The aspect ratio of the first reflective pillar 210 may be a ratio of a height to a width of the first reflective pillar 210. Specifically, the aspect ratio of the first reflective pillar 210 may be represented by the following equation: aspect ratio of first reflective pillar 210=(height of first reflective pillar 210)/(width of first reflective side surface 210c).

The first light blocking layer 310 may be provided on the substrate 100. The first light blocking layer 310 may surround the first reflective pillar 210. The first light blocking layer 310 and the first reflective pillar 210 may not overlap each other in the third direction DR3. The first light blocking layer 310 may reflect or absorb light. For example, the first light blocking layer 310 may reflect or absorb visible light. When the light blocking layer 310 reflects visible light, the first light blocking layer 310 may include a metal. For example, the first light blocking layer 310 may include aluminum (Al), chromium (Cr), silver (Ag), or any combination thereof. When the first light blocking layer 310 absorbs visible light, the first light blocking layer 310 may include a light-absorbing material.

A first opening OP1 may be provided in the first light blocking layer 310. The first opening OP1 may be provided adjacent to the front surface 210e of the first reflective pillar 210. The first opening OP1 may expose the first surface 100a of the substrate 100. When the first light blocking layer 310 extends to an area where the first opening OP1 is arranged, light may enter the first reflective pillar 210 only through the bottom surface 210b of the first reflective pillar 210. The first opening OP1 may be arranged on a path of light entering the first reflective pillar 210 through the front surface 210e of the first reflective pillar 210. The first opening OP1 may allow light to enter the first reflective pillar 210 through the front surface 210e of the first reflective pillar 210. Hereinafter, the light path in the reflective structure 10 is described.

Referring to FIGS. 4 and 5, a first beam L1, a second beam L2, and a third beam L3 may be incident on the second surface 100b of the substrate 100. For example, the first beam L1, the second beam L2, and the third beam L3 may be emitted from real image elements and reach the substrate 100. The first beam L1, the second beam L2, and the third beam L3 illustrated in FIG. 5 may be viewed from the reflective structure 10 in the fourth direction DR4.

The first beam L1 may be provided to the first reflective pillar 210 through the substrate 100. The first beam L1 may enter the first reflective pillar 210 through the bottom surface 210b of the first reflective pillar 210. The first beam L1 may be reflected by the first reflective side surface 210c and the second reflective side surface 210d in the first reflective pillar 210. Points at which the first beam L1 is reflected by the first reflective side surface 210c and the second reflective side surface 210d are indicated by a (1_1)th point P1_1 and a (1_2)th point P1_2. For example, the (1_1)th point P1_1 may be a point at which the first beam L1 is reflected by the first reflective side surface 210c, and the (1_2)th point P1_2 may be a point at which the first beam L1 is reflected by the second reflective side surface 210d. The first beam L1 may be reflected from the (1_2)th point P1_2 and then emitted to the outside of the first reflective pillar 210 through the upper surface 210a. The first beam L1 may contribute to generating a required floating image.

The second beam L2 may be provided to the first opening OP1 through the substrate 100. The second beam L2 may be emitted to the outside of the substrate 100 through the first opening OP1 and reach the front surface 210e of the first reflective pillar 210. The second beam L2 may enter the first reflective pillar 210 through the front surface 210e of the first reflective pillar 210. The second beam L2 may be reflected by the first reflective side surface 210c and the second reflective side surface 210d in the first reflective pillar 210. Points at which the second beam L2 is reflected by the first reflective side surface 210c and the second reflective side surface 210d are indicated by a (2_1)th point P2_1 and a (2_2)th point P2_2. For example, the (2_1)th point P2_1 may be a point at which the second beam L2 is reflected by the first reflective side surface 210c, and the (_2)th point P1_2 may be a point at which the second beam L2 is reflected by the second reflective side surface 210d. The second beam L2 may be reflected from the (2_2)th point P2_2_and then emitted to the outside of the first reflective pillar 210 through the front surface 210e. The second beam L2 may contribute to generating a required floating image together with the first beam L1.

The third beam L3 may reach the first light blocking layer 310 through the substrate 100. The third beam L3 may be reflected or absorbed by the first light blocking layer 310. The third beam L3 may not be emitted to the outside of the substrate 100 through the first surface 100a of the substrate 100. When the first light blocking layer 310 is absent, the third beam L3 may be emitted to the outside of the substrate 100 to contribute to generating a direct image and/or a ghost image. The direct image may refer to an image generated when light emitted from an actual image element is transmitted through the reflective structure without being reflected by the reflective structure 10. The ghost image may refer to an image generated at a non-required position. The third beam L3 may not contribute to generating a floating image.

When the reflective pillar has a rectangular prism shape, light emitted to the outside of the reflective pillar through the four side surfaces of the reflective pillar may not contribute to generating a floating image. Only light emitted to the outside of the reflective pillar through the upper surface of the reflective pillar having a rectangular prism shape may contribute to generating a floating image.

In the present disclosure, a floating image may be generated by using light emitted to the outside of the first reflective pillar 210 through the upper surface 210*a* of the first reflective pillar 210 and light emitted to the outside of the first reflective pillar 210 through the front surface 210*e* of the first reflective pillar 210. Accordingly, the reflective structure 10 having high efficiency may be provided.

The first light blocking layer 310 of the present disclosure may selectively block light (e.g., the third beam L3) that is not provided to the bottom surface 210*b* and the front surface 210*e* of the first reflective pillar 210. Accordingly, the generation of a ghost image and a direct image may be reduced.

Figure 6:
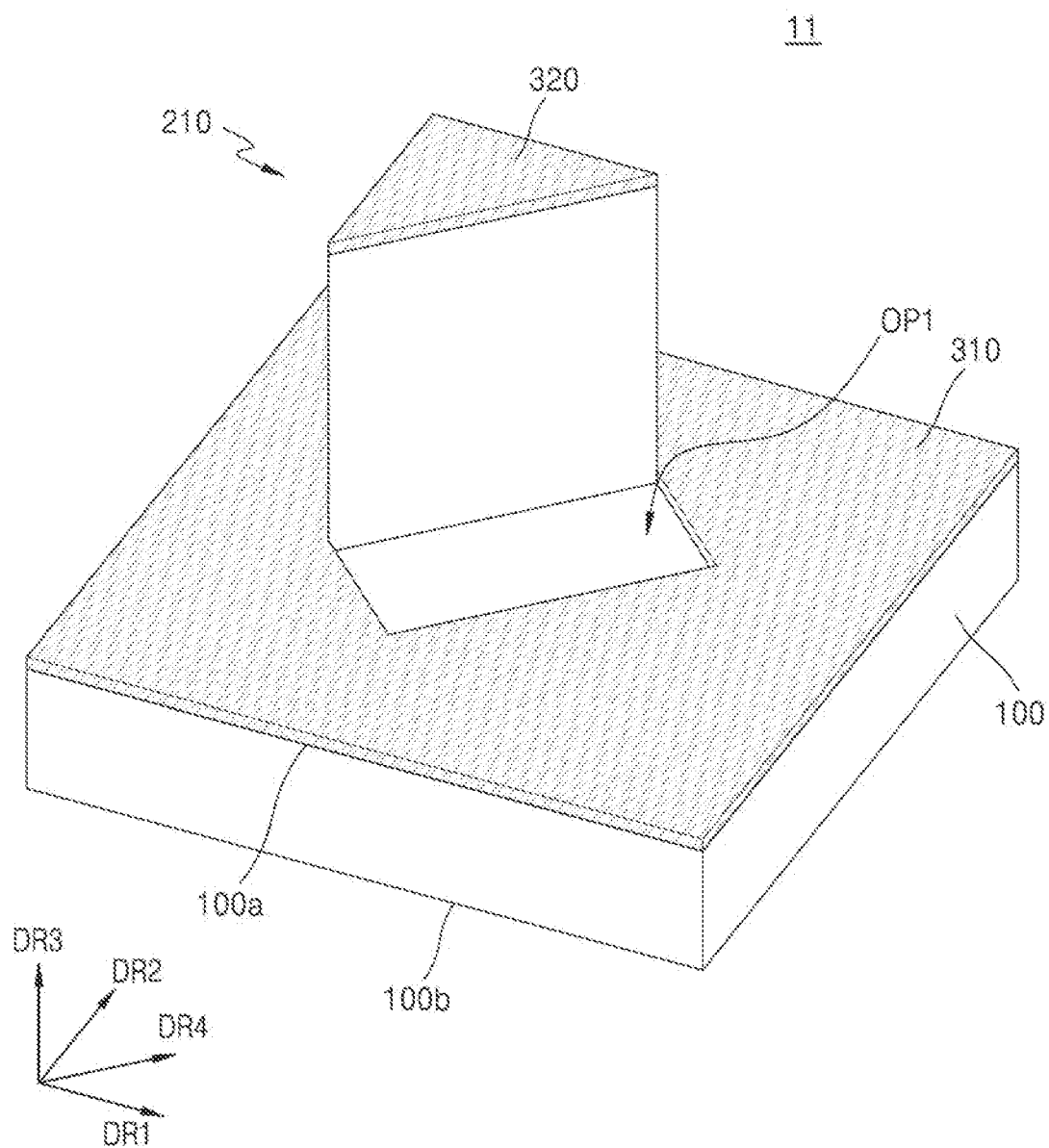
FIG. 6 is a perspective view of a reflective structure according to an example embodiment.
Figure 7:
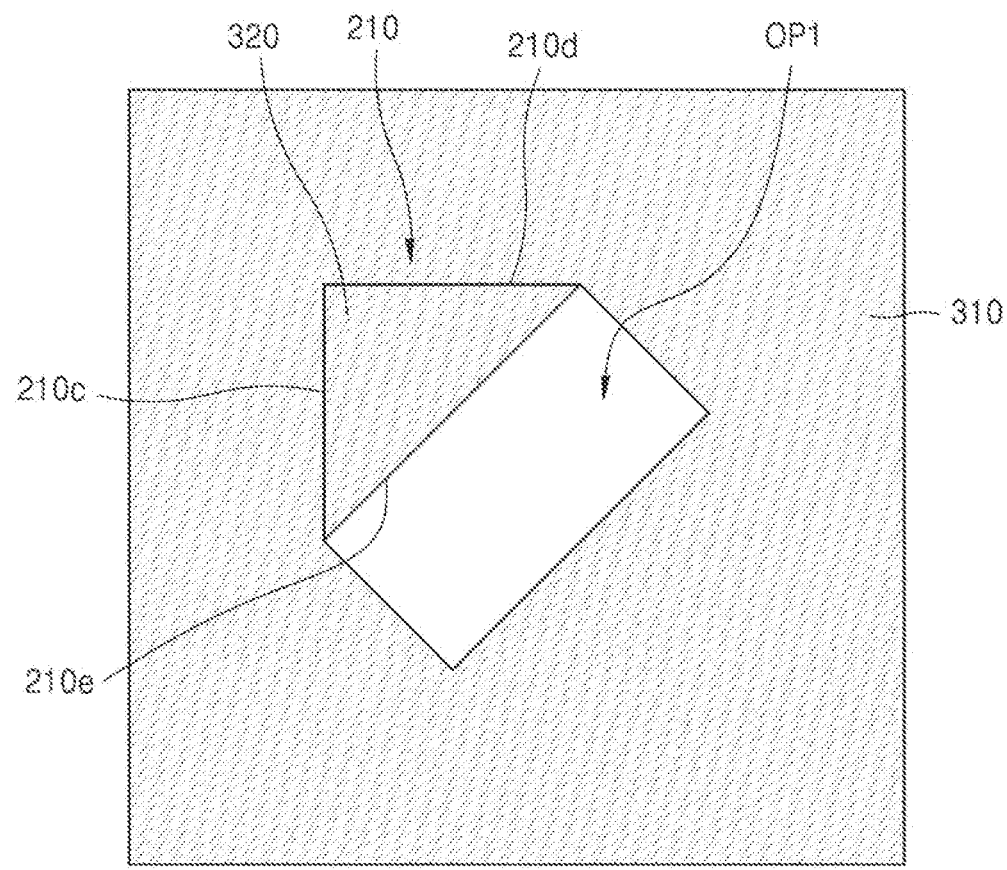
FIG. 7 is a plan view of the reflective structure of FIG. 6.
Figure 7:
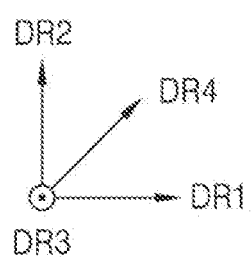
Figure 8:
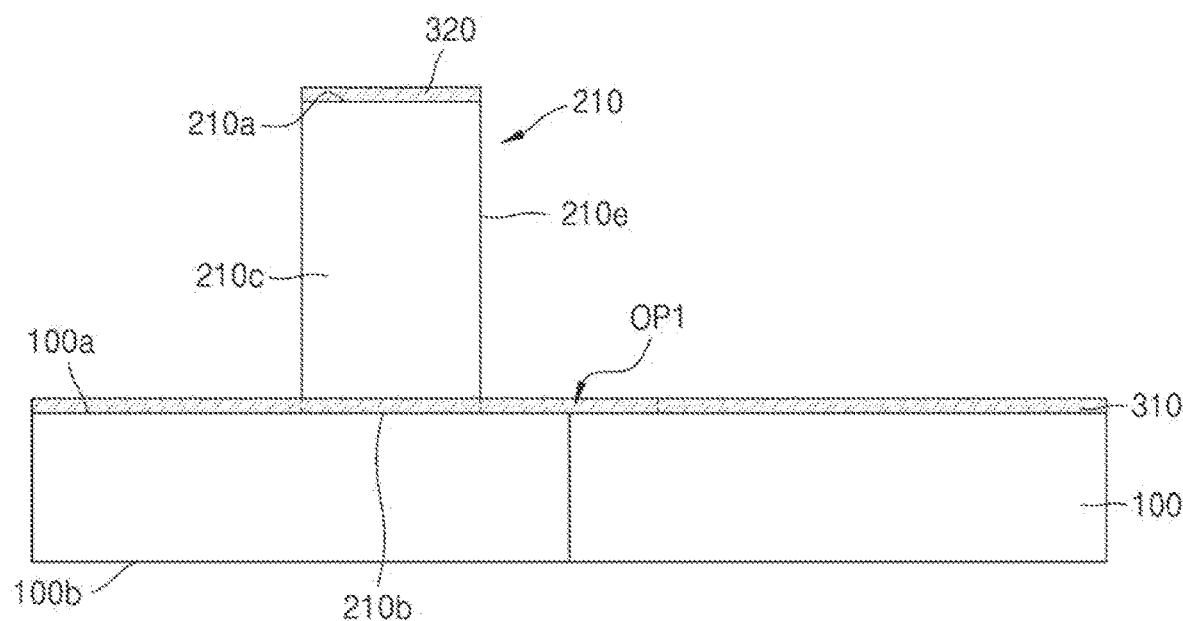
FIG. 8 is a side view of the reflective structure of FIG. 6.
Figure 8:
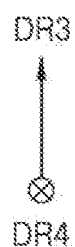
Figure 9:
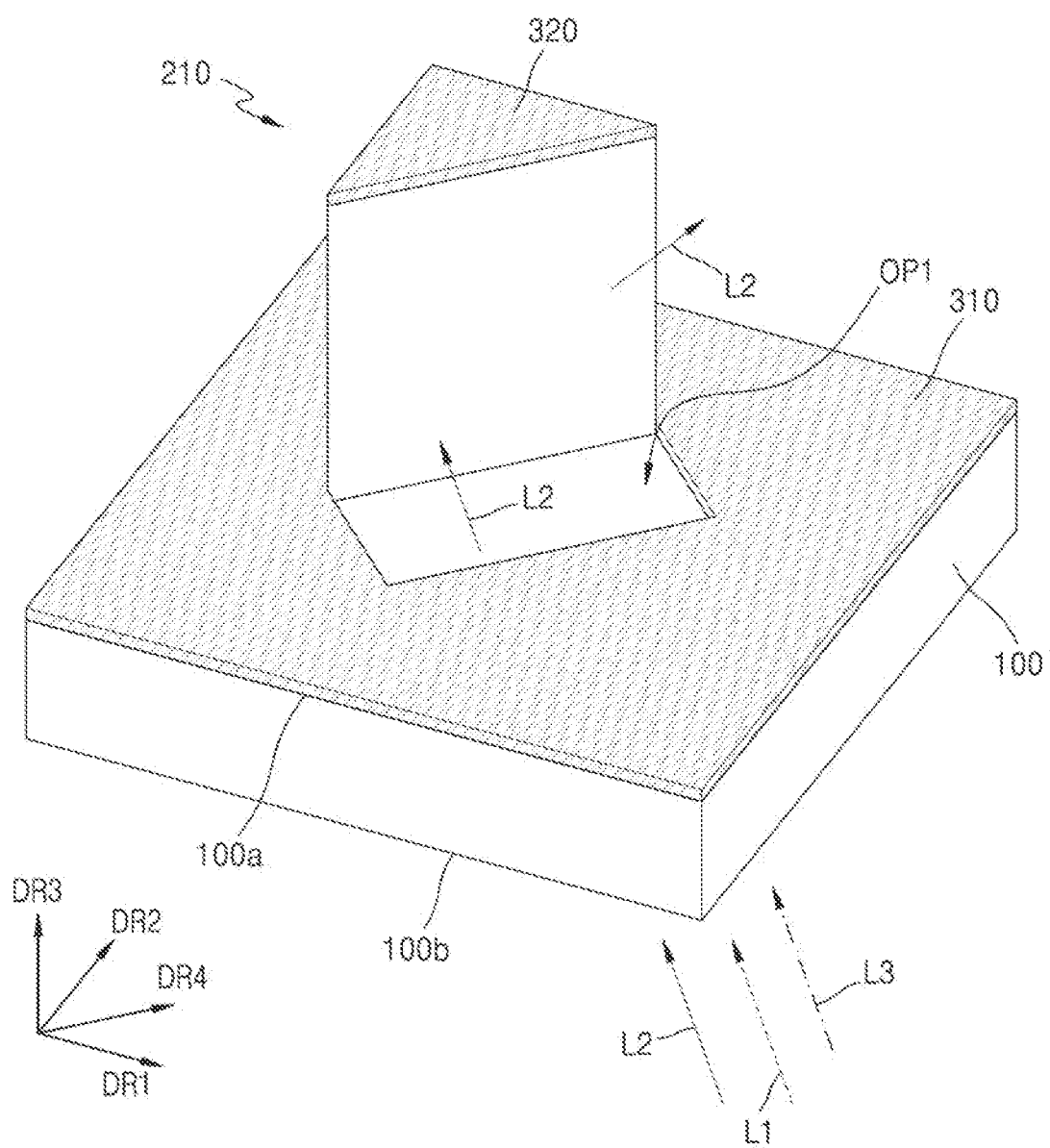
FIG. 9 is a diagram for describing a path of light incident on the reflective structure of FIG. 6.
Figure 10:
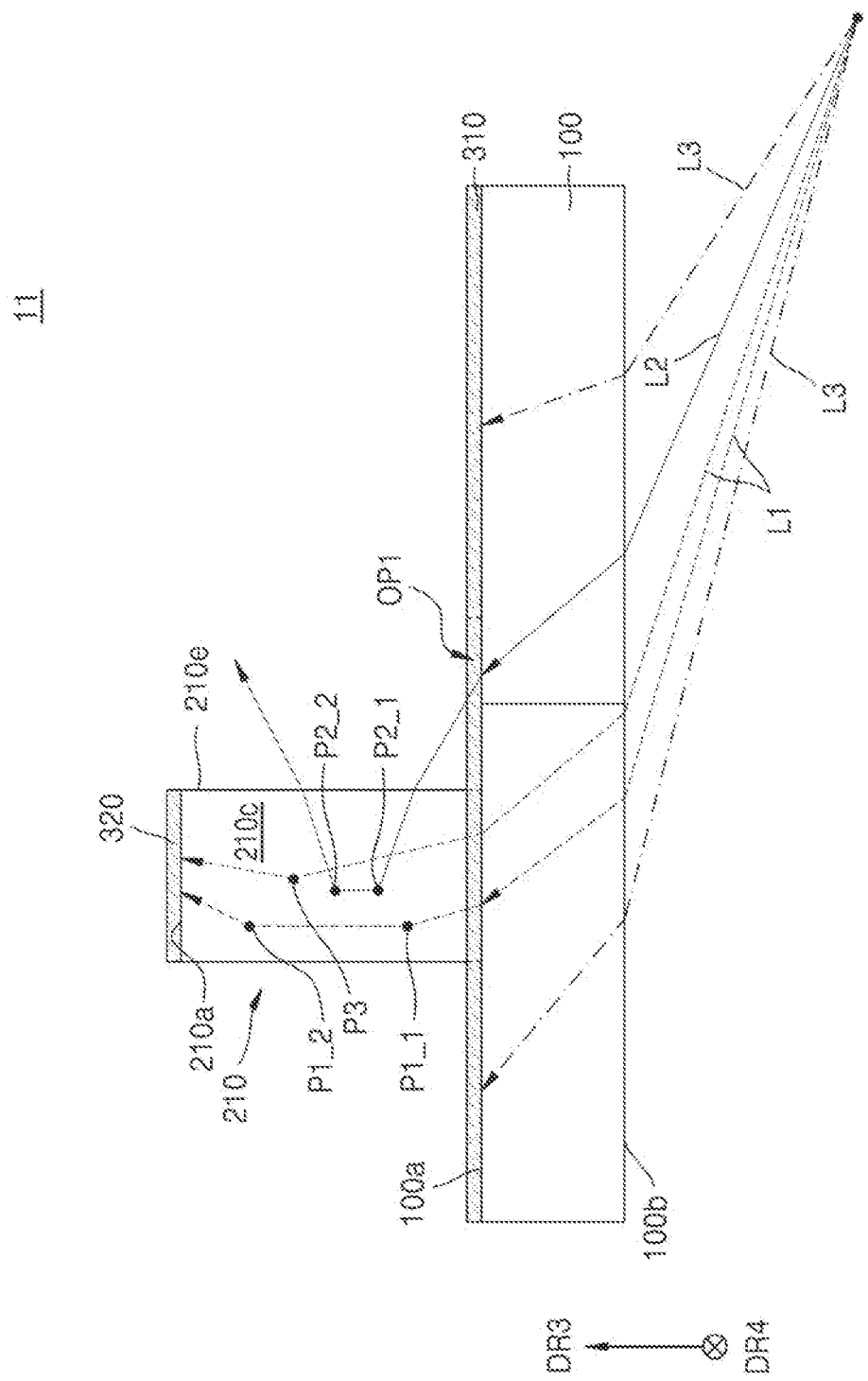
FIG. 10 is a side view of the reflective structure of FIG. 9.

FIG. 6 is a perspective view of a reflective structure according to an example embodiment. FIG. 7 is a plan view of the reflective structure of FIG. 6. FIG. 8 is a side view of the reflective structure of FIG. 6. FIG. 9 is a diagram for describing a path of light incident on the reflective structure of FIG. 6. FIG. 10 is a side view of the reflective structure of FIG. 9. For brevity of explanation, substantially the same descriptions as provided above with reference to FIGS. 1 to 5 may be omitted.

Referring to FIGS. 6 to 8, a reflective structure 11 may be provided. The reflective structure 11 may include a substrate 100, a first light blocking layer 310, a first reflective pillar 210, and a second light blocking layer 320. The substrate 100, the first light blocking layer 310, and the first reflective pillar 210 may be substantially the same as the substrate 100, the first light blocking layer 310, and the first reflective pillar 210 described with reference to FIGS. 1 to 3, respectively.

Unlike those described with reference to FIGS. 1 to 3, the second light blocking layer 320 may be provided on an upper surface 210*a* of the first reflective pillar 210. The second light blocking layer 320 may reflect or absorb light. The second light blocking layer 320 may include substantially the same material as that of the first light blocking layer 310. The second light blocking layer 320 may prevent light from being emitted to the outside of the first reflective pillar 210 through the upper surface 210*a* of the first reflective pillar 210. Although the second light blocking layer 320 is illustrated as completely covering the upper surface 210*a* of the first reflective pillar 210, this is only an example. In another example, the second light blocking layer 320 may cover a portion of the upper surface 210*a* of the first reflective pillar 210 and expose the remaining portion thereof.

Referring to FIGS. 9 and 101, a first beam L1, a second beam L2, and a third beam L3 may be incident on a second surface 100*b* of the substrate 100. For example, the first beam L1, the second beam L2, and the third beam L3 may be emitted from real image elements and reach the substrate 100. The second beam L2 and the third beam L3 may be substantially the same as the second beam L2 and the third beam L3 described with reference to FIGS. 4 and 5, respectively. A portion of the first beam L1 may be reflected by a first reflective side surface 210*c* and a second reflective side surface 210*d* in the first reflective pillar 210, and another portion of the first beam L1 may be reflected by one of the first reflective side surface 210*c* and the second reflective side surface 210*d* in the first reflective pillar 210.

Unlike those described with reference to FIGS. 4 and 5, the second light blocking layer 320 may reflect or absorb the first beam LB1. The first beam LB1 may not be emitted to the outside of the first reflective pillar 210 through the upper surface 210*a* of the first reflective pillar 210. The second light blocking layer 320 may prevent a ghost image from being generated by another portion of the first beam L1 (that is, the first beam L1 reflected by one of the first reflective side surface 210*c* and the second reflective side surface 210*d* in the first reflective pillar 210).

The present disclosure may provide the reflective structure 11 that generates a floating image with high sharpness by preventing a direct image and a ghost image from being generated.

Figure 11:
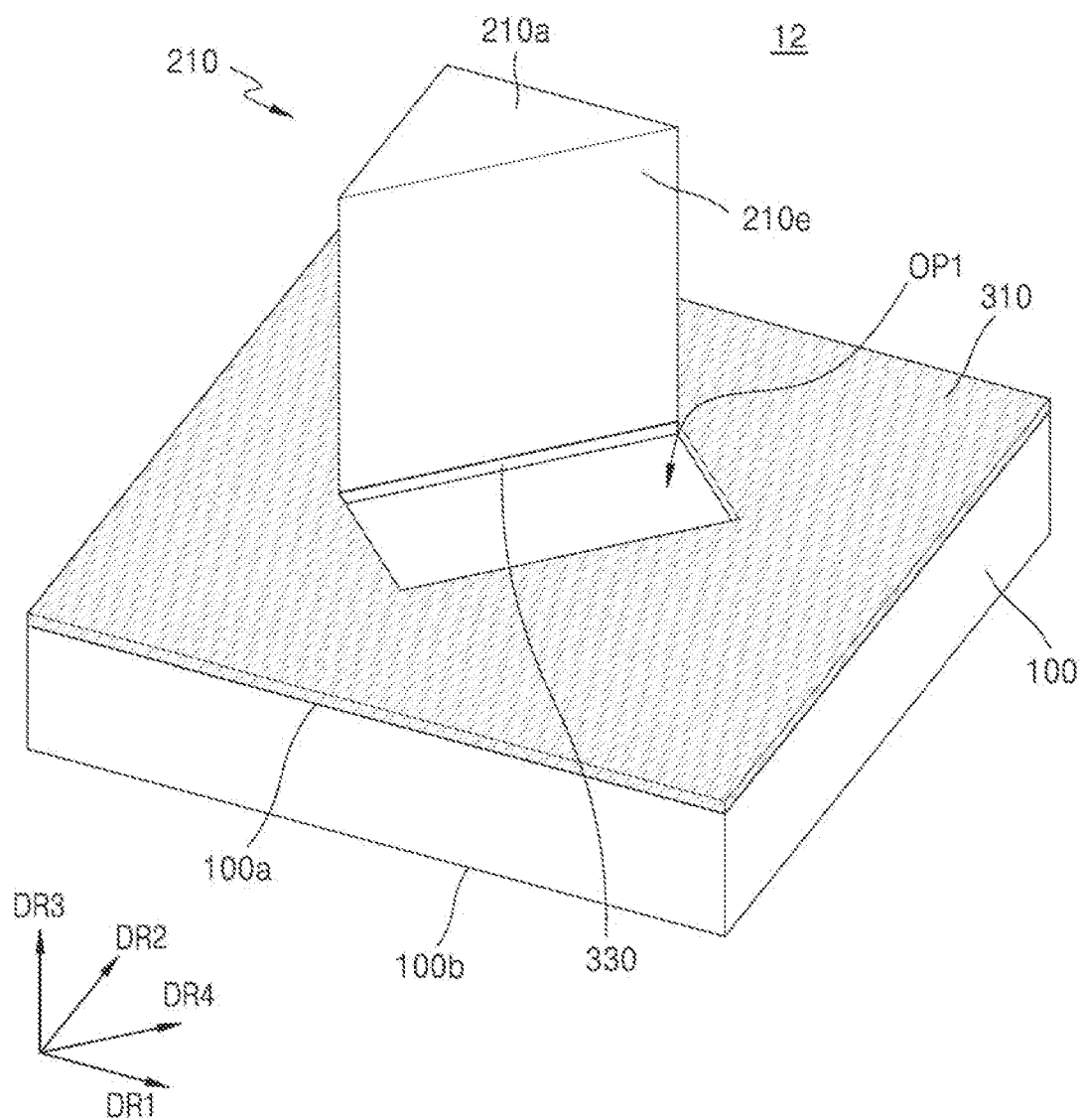
FIG. 11 is a perspective view of a reflective structure according to an example embodiment.
Figure 12:
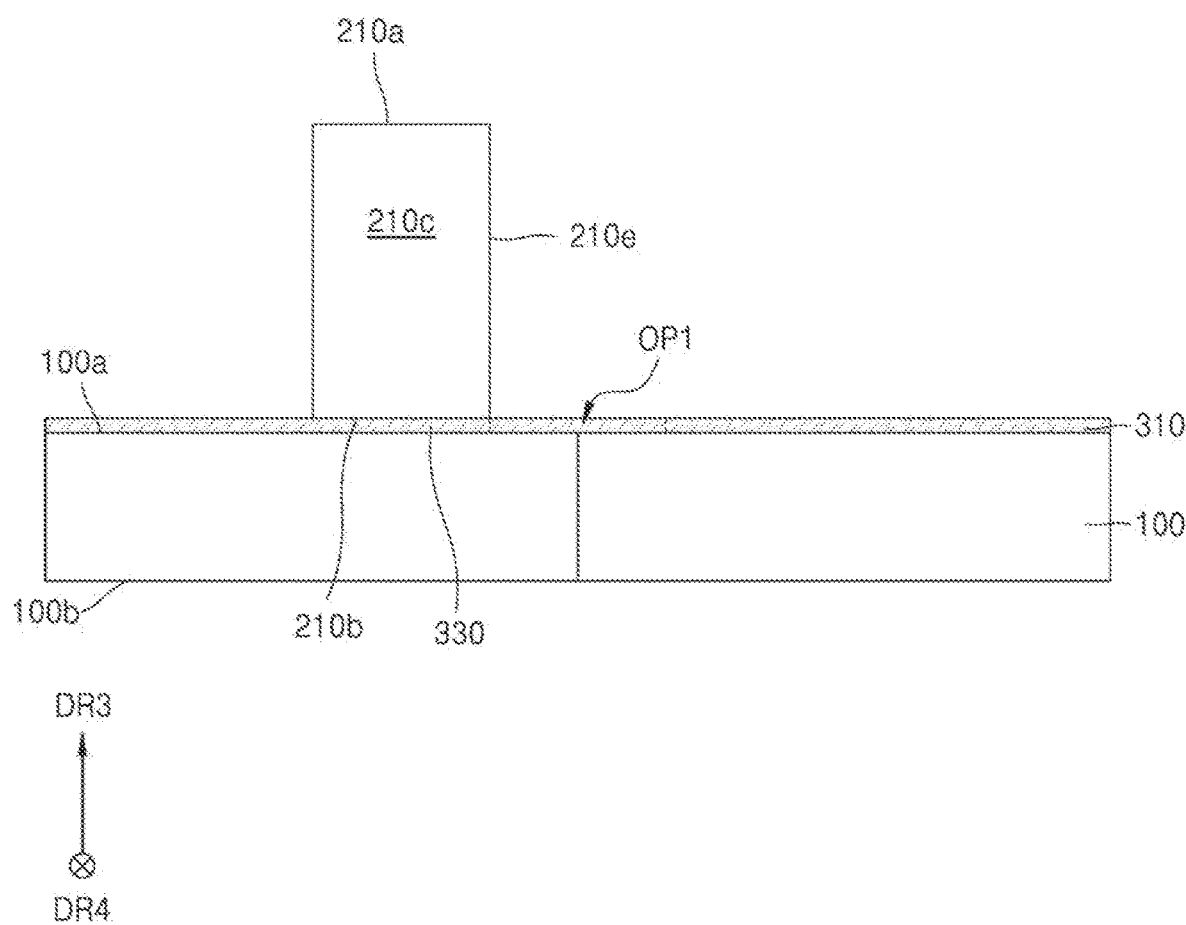
FIG. 12 is a side view of the reflective structure of FIG. 11.

FIG. 11 is a perspective view of a reflective structure according to an example embodiment. FIG. 12 is a side view of the reflective structure of FIG. 11. For brevity of explanation, substantially the same descriptions as provided above with reference to FIGS. 1 to 3 and FIGS. 9 and 10 may be omitted.

Referring to FIGS. 11 and 12, a reflective structure 12 may be provided. The reflective structure 12 may include a substrate 100, a first light blocking layer 310, a third light blocking layer 330, and a first reflective pillar 210. The substrate 100, the first light blocking layer 310, and the first reflective pillar 210 may be substantially the same as the substrate 100, the first light blocking layer 310, and the first reflective pillar 210 described reference to FIGS. 1 to 3, respectively.

The third light blocking layer 330 may be arranged between the substrate 100 and the first reflective pillar 210. The substrate 100 and the first reflective pillar 210 may be spaced apart from each other by the third light blocking layer 330. Although the third light blocking layer 330 is illustrated as completely covering a bottom surface 210*b* of the first reflective pillar 210, the present disclosure is not limited thereto. In another example embodiment, the third light blocking layer 330 may cover a portion of the bottom surface 210*b* of the first reflective pillar 210 and expose another portion thereof. In this case, the other portion of the exposed bottom surface 210*b* of the first reflective pillar 210 may extend toward the substrate 100 and may be in direct contact with a first surface 100*a* of the substrate 100. The third light blocking layer 330 may reflect or absorb light. The third light blocking layer 330 may include substantially the same material as that of the first light blocking layer 310 described with reference to FIGS. 1 to 3. The third light blocking layer 330 and the first light blocking layer 310 may form a single structure. For example, the third light blocking layer 330 and the first light blocking layer 310 may be connected to each other without a boundary therebetween.

The third light blocking layer 330 may block light from entering the first reflective pillar 210 through the bottom surface 210*b* of the first reflective pillar 210. For example, the third light blocking layer 330 may block the first beam L1 described with reference to FIGS. 9 and 10 from entering the first reflective pillar 210. Therefore, it is possible to prevent a ghost image from being generated by another portion of the first beam L1 (that is, the first beam L1 reflected by one of a first reflective side surface 210*c* and a second reflective side surface 210*d* in the first reflective pillar 210).

The present disclosure may provide a reflective structure 12 that generates a floating image with high clarity by preventing a direct image and a ghost image from being generated.

Figure 13:
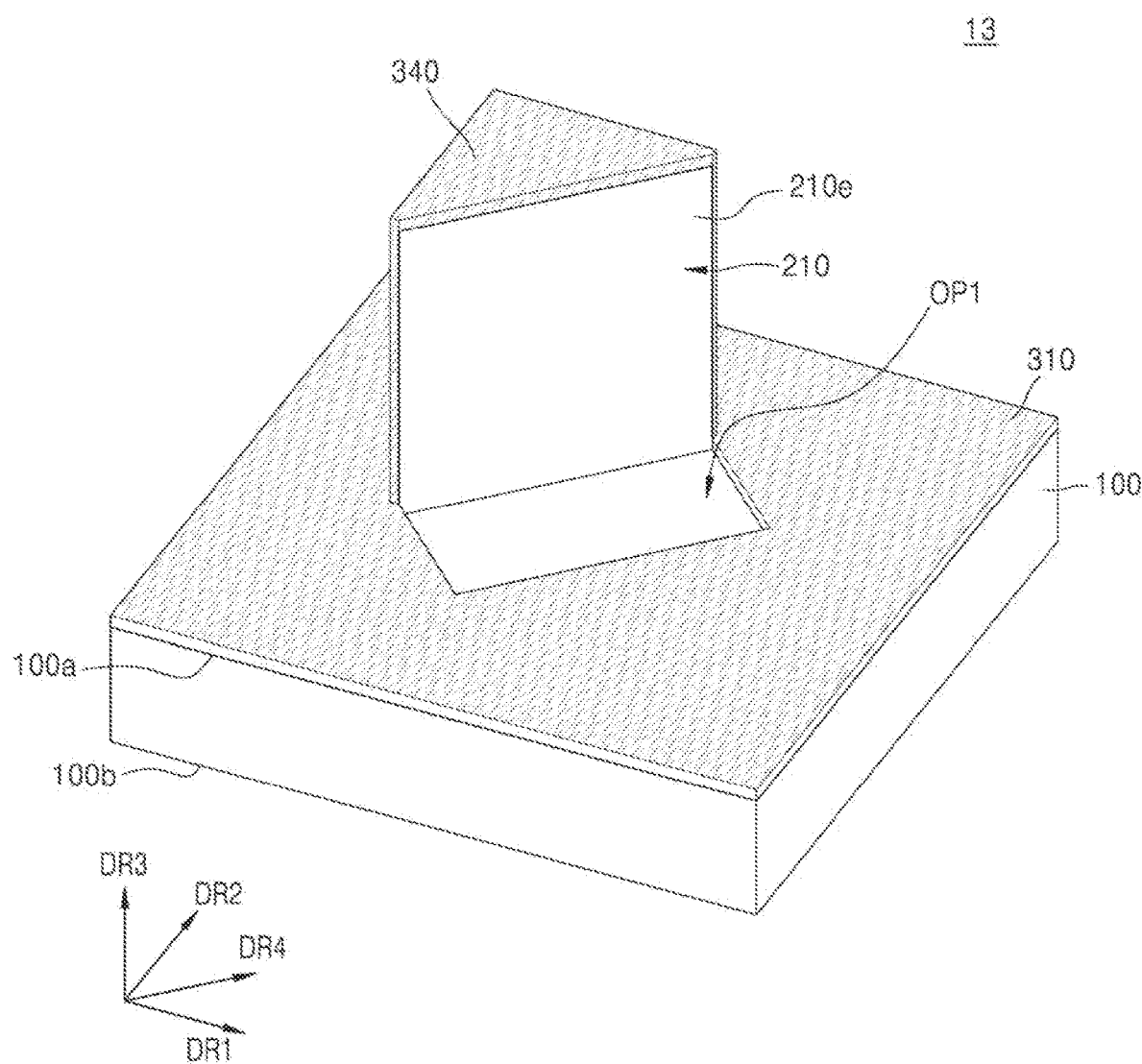
FIG. 13 is a perspective view of a reflective structure according to an example embodiment.
Figure 14:
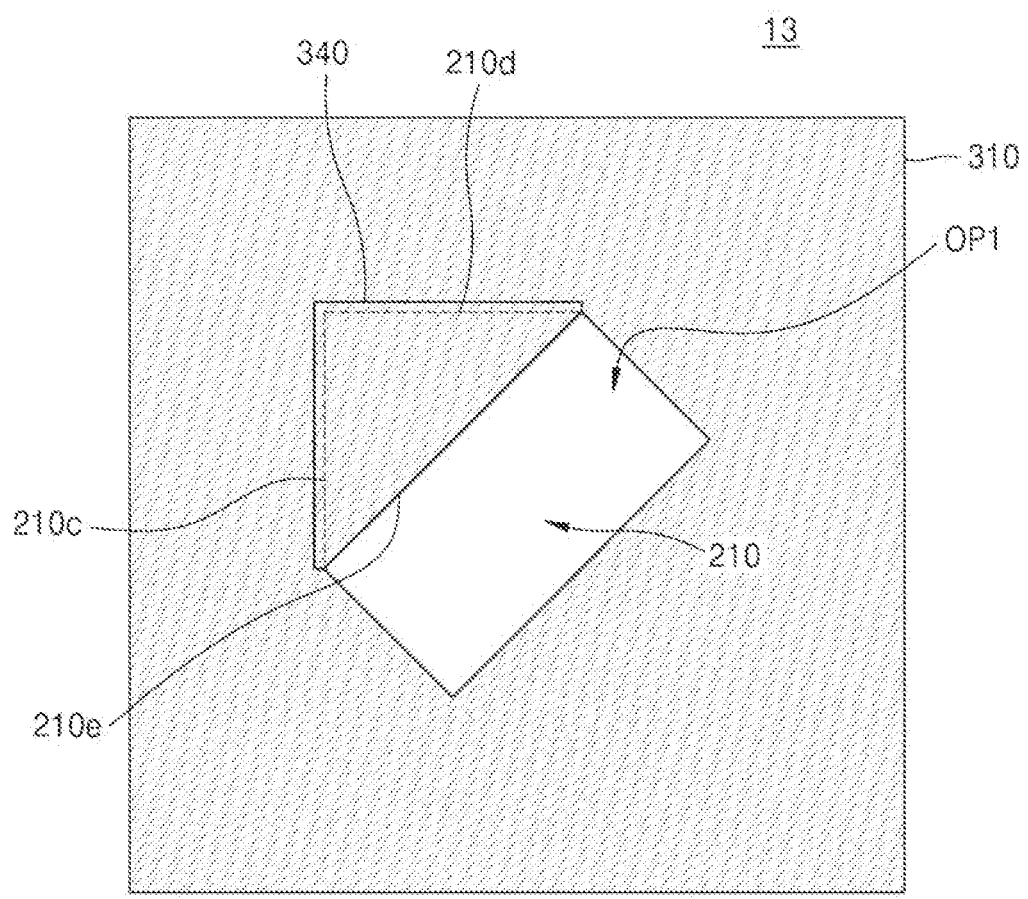
FIG. 14 is a plan view of the reflective structure of FIG. 13.
Figure 14:
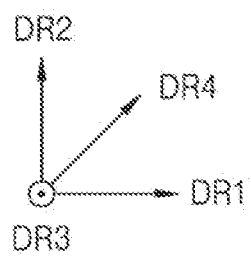
Figure 15:
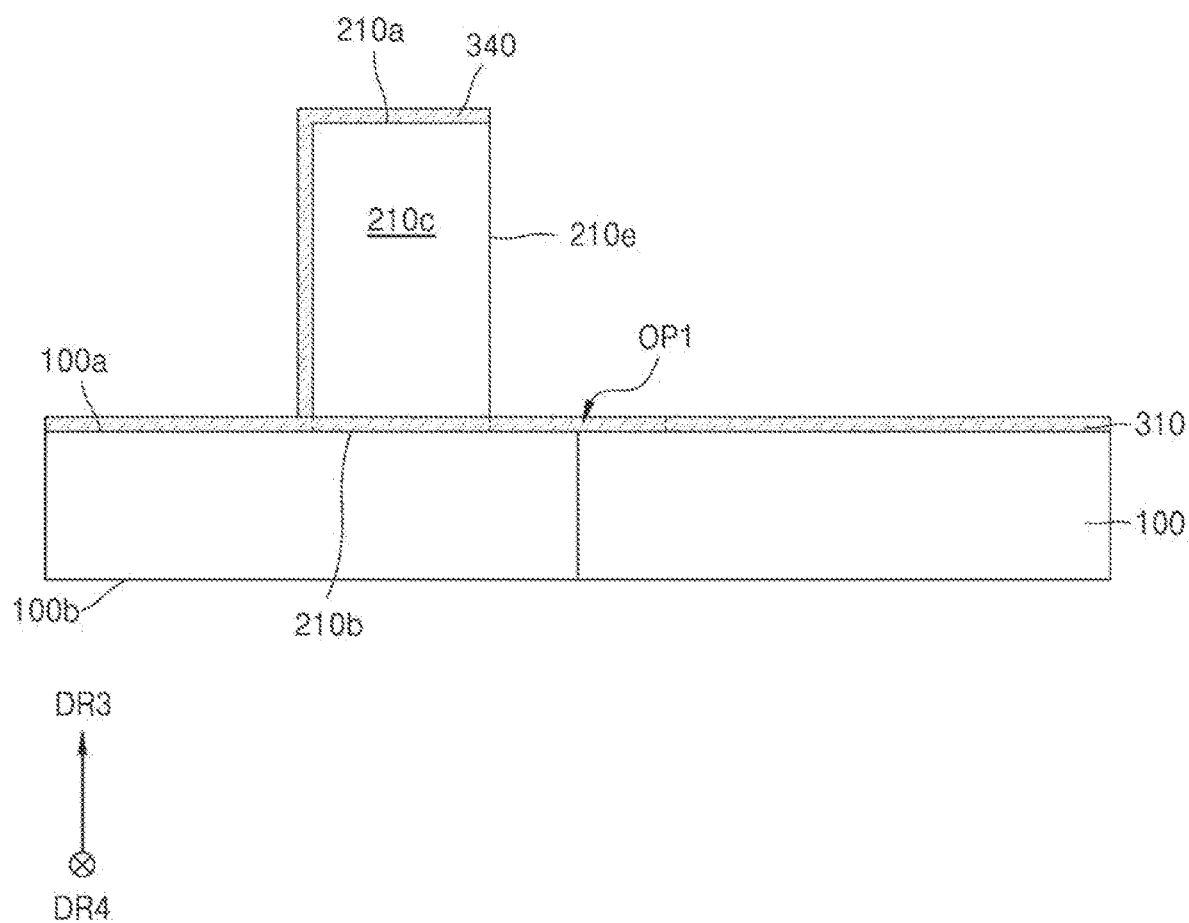
FIG. 15 is a side view of the reflective structure of FIG. 13.

FIG. 13 is a perspective view of a reflective structure according to an example embodiment. FIG. 14 is a plan view of the reflective structure of FIG. 13. FIG. 15 is a side view of the reflective structure of FIG. 13. For brevity of explanation, substantially the same descriptions as provided above with reference to FIGS. 1 to 3 and FIGS. 9 and 10 may be omitted.

Referring to FIGS. 13 to 15, a reflective structure 13 may be provided. The reflective structure 13 may include a substrate 100, a first light blocking layer 310, a fourth light blocking layer 340, and a first reflective pillar 210. The substrate 100, the first light blocking layer 310, and the first reflective pillar 210 may be substantially the same as the substrate 100, the first light blocking layer 310, and the first reflective pillar 210 described with reference to FIGS. 1 to 3, respectively.

Unlike those described with reference to FIGS. 1 to 3, a fourth light blocking layer 340 may be provided on an upper surface 210a, a first reflective side surface 210c, and a second reflective side surface 210d of the first reflective pillar 210. The fourth light blocking layer 340 may reflect light. For example, the fourth light blocking layer 340 may include substantially the same material as that of the first light blocking layer 310 that reflects light.

Although the fourth light blocking layer 340 is illustrated as completely covering the upper surface 210a, the first reflective side surface 210c, and the second reflective side surface 210d of the first reflective pillar 210, the present disclosure is not limited thereto. In another example embodiment, the fourth light blocking layer 340 may partially cover each of the upper surface 210a, the first reflective side surface 210c, and the second reflective side surface 210d of the first reflective pillar 210. The fourth light blocking layer 340 disposed on the first reflective side surface 210c and the second reflective side surface 210d may increase the light reflection efficiency of the first reflective side surface 210c and the second reflective side surface 210d. In other words, the fourth light blocking layer 340 may increase the intensity of reflected light, compared to the intensity of light incident on the first reflective side surface 210c and the second reflective side surface 210d. The fourth light blocking layer 340 disposed on the upper surface 210a of the first reflective pillar 210 may prevent a ghost image from being generated by another portion of the first beam L1 described with reference to FIGS. 9 and 10 (that is, the first beam L1 reflected by one of the first reflective side surface 210c and the second reflective side surface 210d in the first reflective pillar 210).

The present disclosure may provide the reflective structure 13 that generates a floating image with high clarity by preventing a direct image and a ghost image from being generated. The present disclosure may provide the reflective structure 13 having high efficiency.

Figure 16:
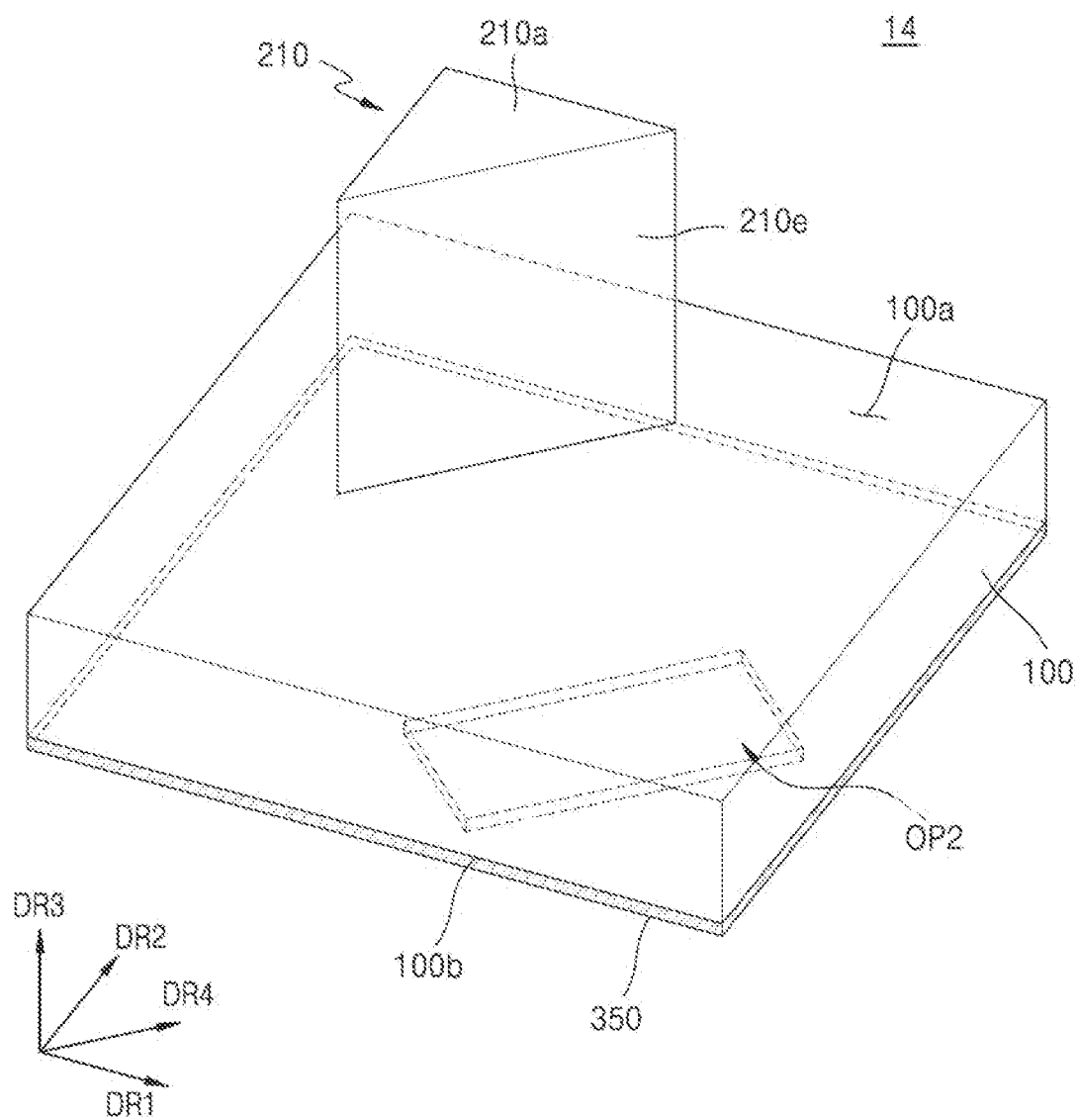
FIG. 16 is a perspective view of a reflective structure according to an example embodiment.
Figure 17:
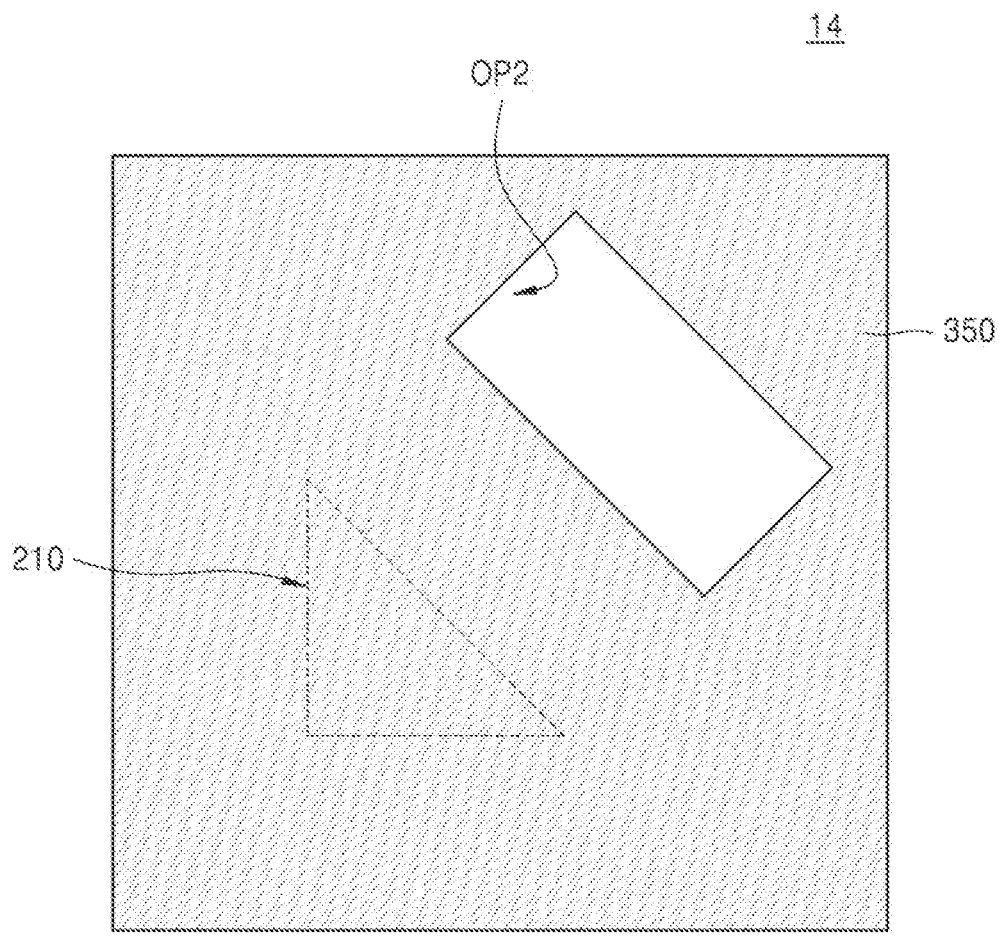
FIG. 17 is a bottom view of the reflective structure of FIG. 16.
Figure 17:
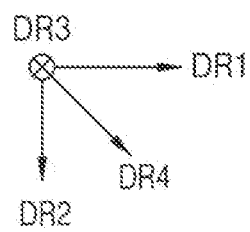
Figure 18:
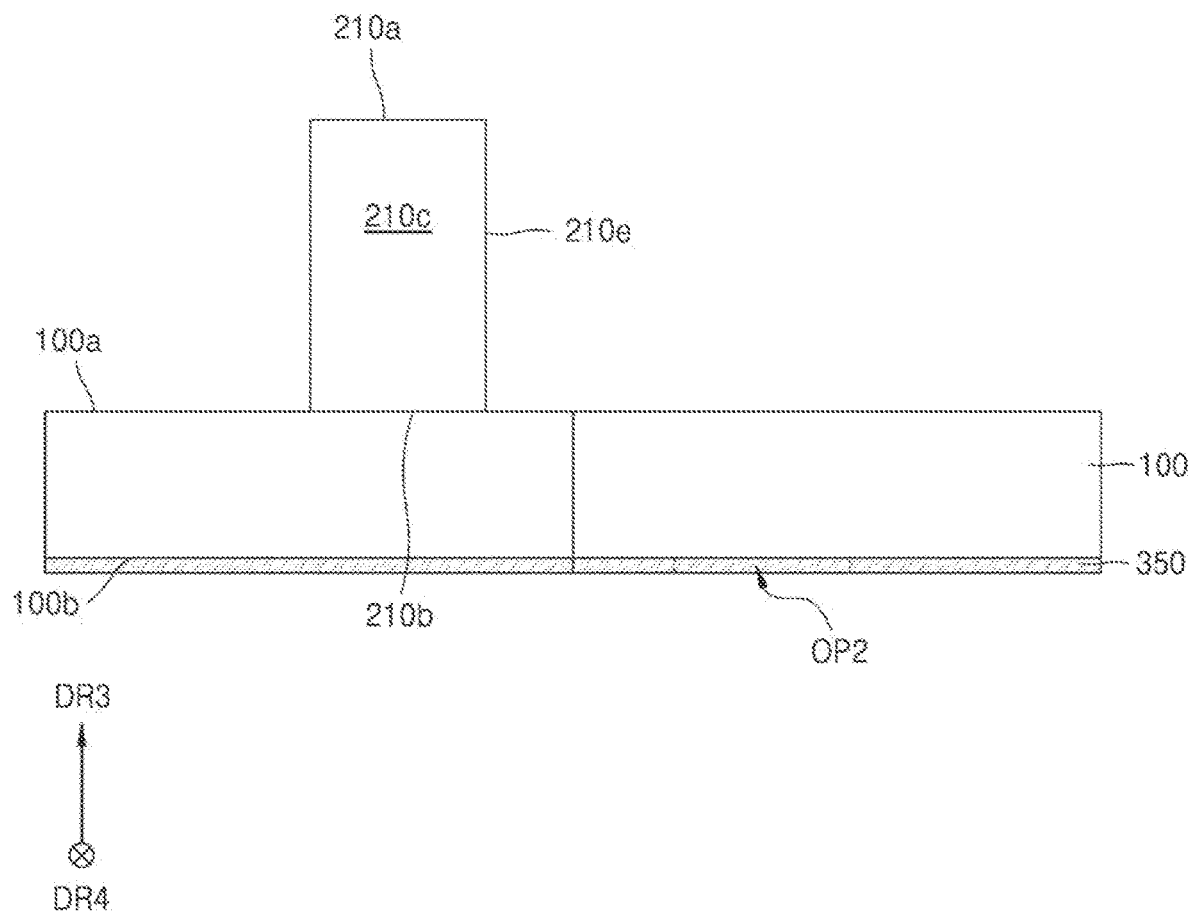
FIG. 18 is a side view of the reflective structure of FIG. 16.

FIG. 16 is a perspective view of a reflective structure according to an example embodiment. FIG. 17 is a bottom view of the reflective structure of FIG. 16. FIG. 18 is a side view of the reflective structure of FIG. 16. For brevity of explanation, substantially the same descriptions as provided above with reference to FIGS. 1 to 5 may be omitted.

Referring to FIGS. 16 to 18, a reflective structure 14 may be provided. The reflective structure 14 may include a substrate 100, a fifth light blocking layer 350, and a first reflective pillar 210. The substrate 100 and the first reflective pillar 210 may be substantially the same as those described with reference to FIGS. 1 to 3.

The fifth light blocking layer 350 may be provided on a second surface 100b of the substrate 100. The fifth light blocking layer 350 may reflect or absorb light. For example, the fifth light blocking layer 350 may include substantially the same material as that of the first light blocking layer 310 described with reference to FIGS. 1 to 3. The fifth light blocking layer 350 may include a second opening OP2 exposing the second surface 100b of the substrate 100.

With respect to the third direction DR3, the second opening OP2 may be misaligned with the first reflective pillar 210. The second opening OP2 may not overlap the first reflective pillar 210 in the third direction DR3. For example, the second opening OP2 may be spaced apart from an area facing the first reflective pillar 210. Light (the first beam L1 and the second beam L2 of FIGS. 4 and 5) provided to the first reflective pillar 210 through the substrate 100 may pass through the second opening OP2.

The fifth light blocking layer 350 may selectively pass light (the first beam L1 and the second beam L2 of FIGS. 4 and 5) that travels toward the first reflective pillar 210. The fifth light blocking layer 350 may block light (the third beam L3 of FIGS. 4 and 5) that does not travel toward the first reflective pillar 210.

The present disclosure may provide the reflective structure 14 that generates a floating image by using light (the first beam L1 and the second beam L2 of FIGS. 4 and 5) emitted from the first reflective pillar 210 through an upper surface 210a and a front surface 210e of the first reflective pillar 210. The present disclosure may provide the reflective structure 14 that prevents a direct image from being generated.

Figure 19:
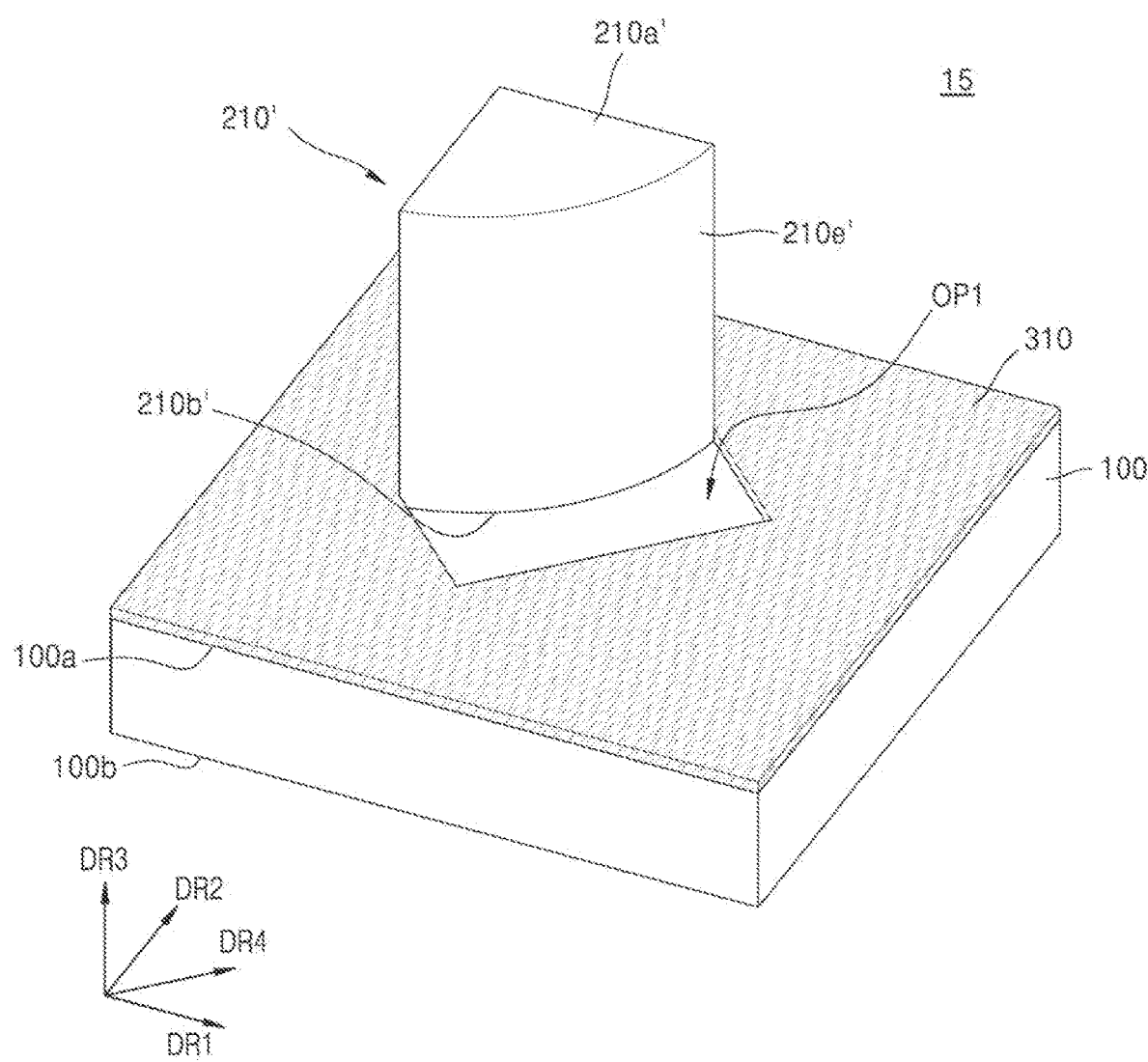
FIG. 19 is a perspective view of a reflective structure according to an example embodiment.
Figure 20:
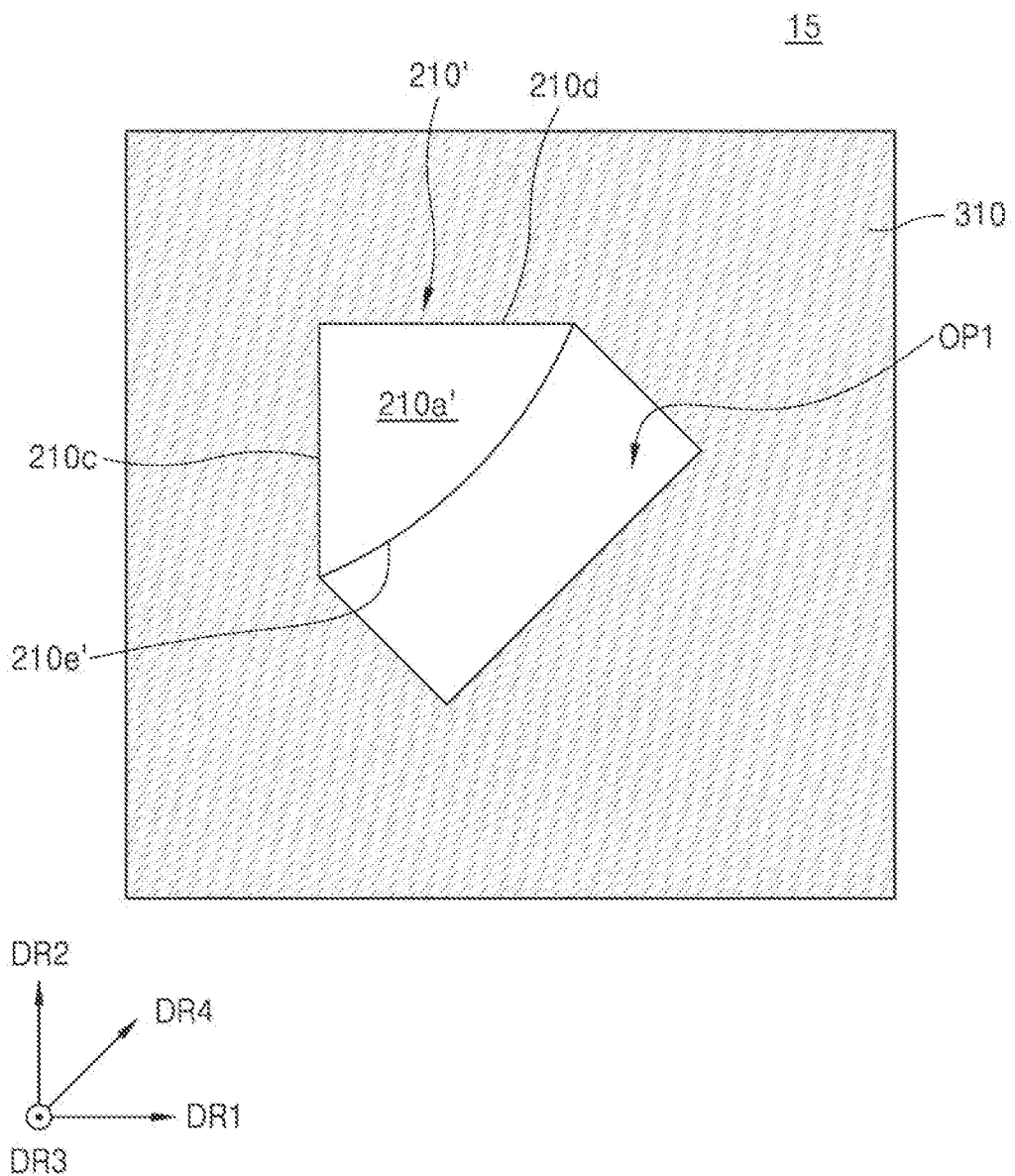
FIG. 20 is a plan view of the reflective structure of FIG. 19.

FIG. 19 is a perspective view of a reflective structure according to an example embodiment. FIG. 20 is a plan view of the reflective structure of FIG. 19. For brevity of explanation, substantially the same descriptions as provided above with reference to FIGS. 1 to 5 may be omitted.

Referring to FIGS. 19 and 20, a reflective structure 15 may be provided. The reflective structure 15 may include a substrate 100, a first light blocking layer 310, and a second reflective pillar 210'. The substrate 100 and the first light blocking layer 310 may be substantially the same as the substrate 100 and the first light blocking layer 310 described with reference to FIGS. 1 to 3, respectively.

The second reflective pillar 210' may include an upper surface 210a', a bottom surface 210b', a first reflective side surface 210c, a second reflective side surface 210d, and a front surface 210e'. The first reflective side surface 210c and the second reflective side surface 210d may be substantially the same as the first reflective side surface 210c and the second reflective side surface 210d described with reference to FIGS. 1 to 3, respectively.

Unlike those described with reference to FIGS. 1 to 3, the upper surface 210a' and the bottom surface 210b' may each have a fan shape. The front surface 210e' may have a convex shape. When viewed from the third direction DR3, the front surface 210e' may focus light emitted from the second reflective pillar 210' through the front surface 210e'. The second reflective pillar 210' may be substantially the same as a portion of a cylindrical shape.

The present disclosure may provide the reflective structure 15 having high efficiency. The present disclosure may provide the reflective structure 15 that prevents a direct image from being generated.

Figure 21:
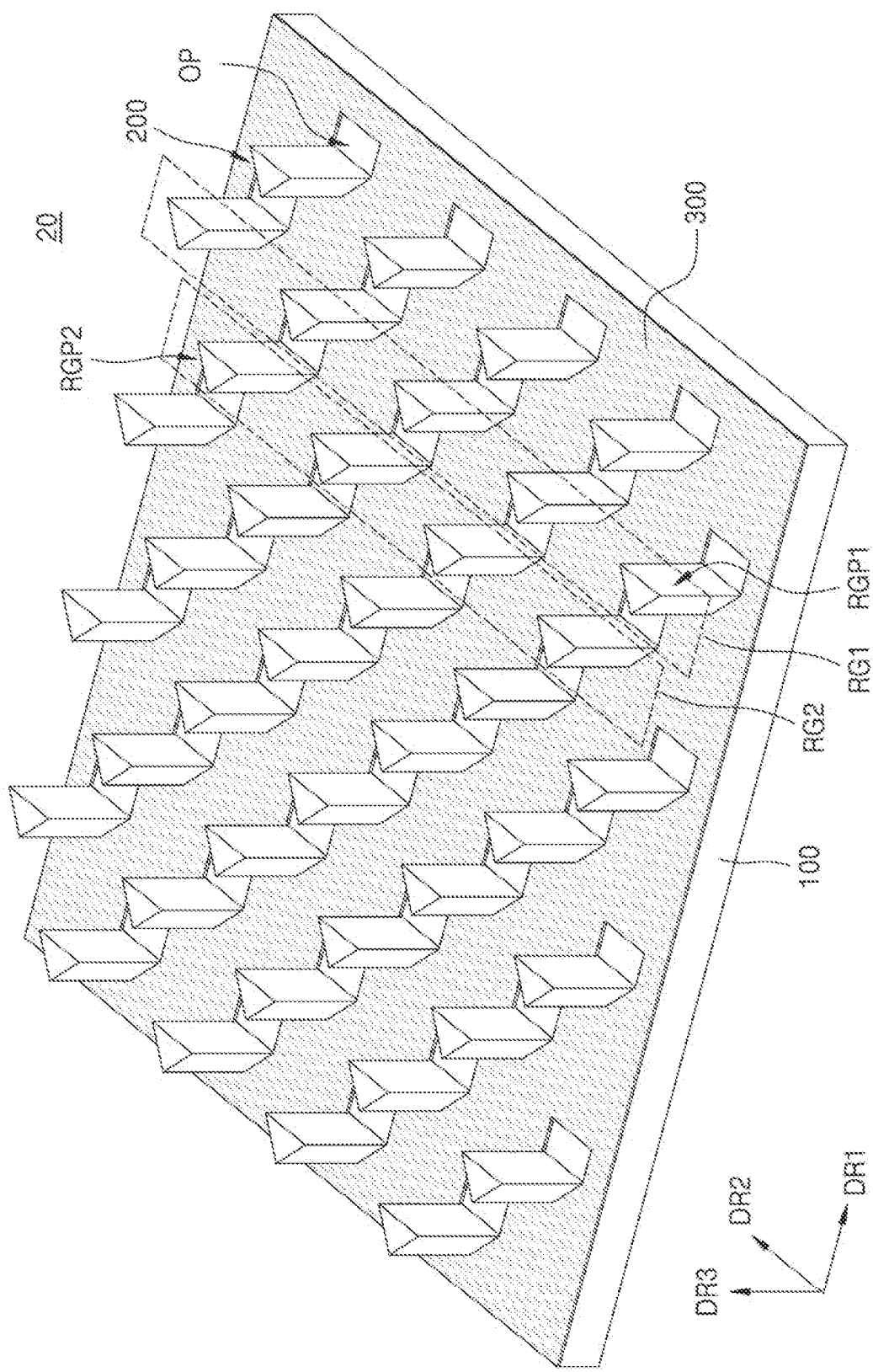
FIG. 21 is a diagram illustrating an overall shape of a reflective structure array according to an example embodiment.
Figure 22:
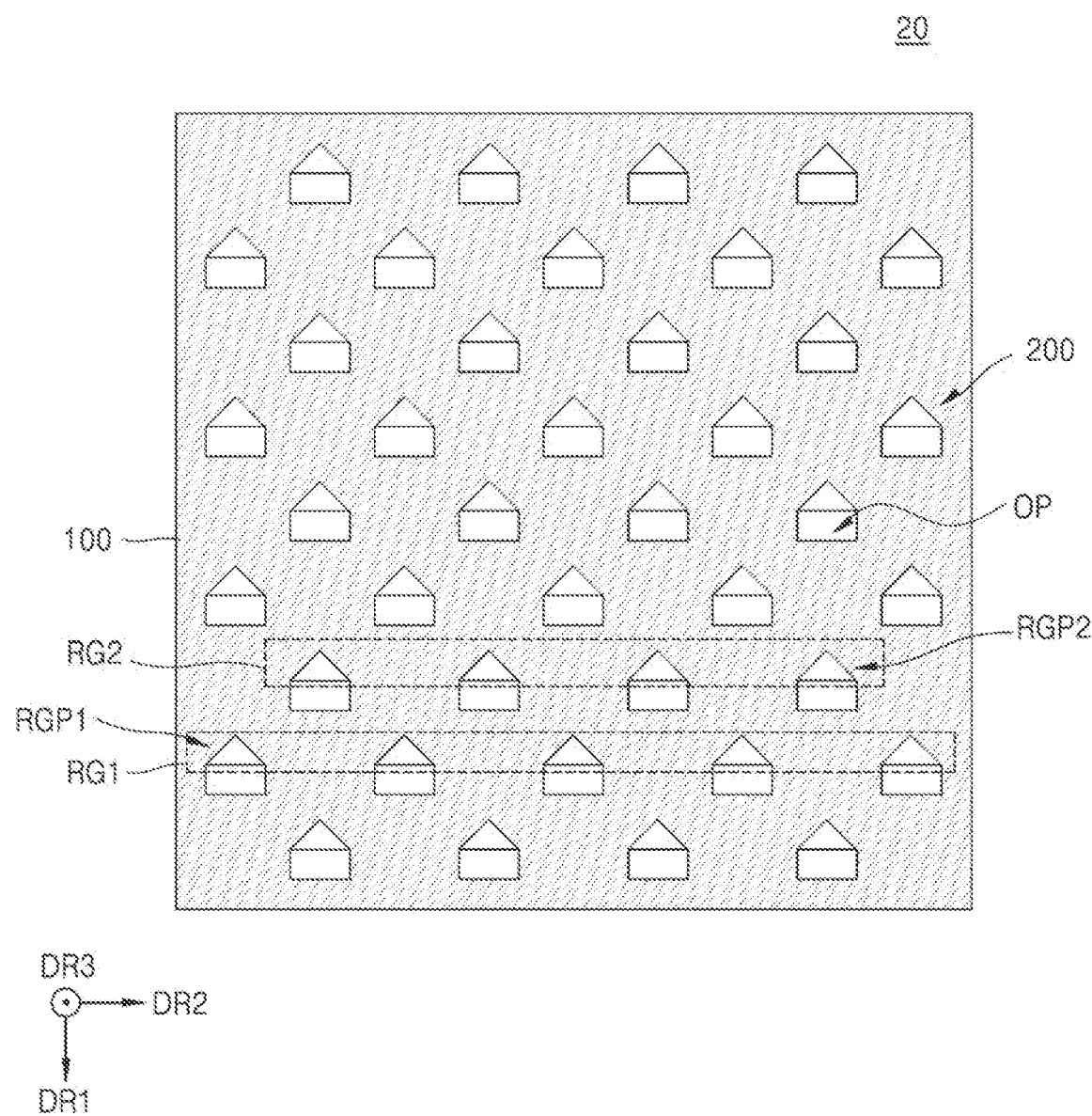
FIG. 22 is a plan view of the reflective structure of FIG. 21.

FIG. 21 is a diagram illustrating an overall shape of a reflective structure array according to an example embodiment. FIG. 22 is a plan view of the reflective structure of FIG. 21. For brevity of explanation, substantially the same descriptions as provided above with reference to FIGS. 1 to 3 may be omitted.

Referring to FIGS. 21 and 22, a reflective structure array 20 may be provided. The reflective structure array 20 may include a substrate 100, a light blocking layer 300 including a plurality of openings OP, and a plurality of reflective pillars 200. The reflective structure array 20 may be substantially the same as the reflective structure 10 described with reference to FIGS. 1 to 3, except that the openings OP and the reflective pillars 200 are provided. However, in another example, the reflective structure array 20 may be an array of at least one of the reflective structures 11, 12, 13, 14, and 15 described above. Hereinafter, the arrangement of the openings OP and the reflective pillars 200 will be described.

The reflective pillars 200 may include a plurality of first reflective groups RG1 and a plurality of second reflective groups RG2, which are alternately arranged in the first direction DR1. The first reflective groups RG1 may each include first reflective pillars RGP1 arranged in the second direction DR2. For example, the first reflective pillars RGP1 may be arranged at regular intervals. The second reflective groups RG2 may each include second reflective pillars RGP2 arranged in the second direction DR2. For example, the second reflective pillars RGP2 may be arranged at regular intervals. For example, the distance between the reflective pillars 200 may be equal to or less than twice the height of the reflective pillars 200. For example, the distance between the front surfaces (210e of FIGS. 1 to 3) of the reflective pillars 200 may be equal to or greater than 0.3 times the height of the reflective pillars 200.

The first reflective groups RG1 and the second reflective groups RG2 may be alternately arranged. For example, when viewed from the first direction DR1, the second reflective pillars RGP2 may be provided between the first reflective pillars RGP1. For example, the first reflective pillars RGP1 and the second reflective pillars RGP2 in the first reflective group RG1 and the second reflective group RG2, which are immediately adjacent to each other, may be arranged in a zigzag shape in the second direction DR2.

In the present disclosure, the minimum distance between the reflective pillars 200 may be the distance between the first reflective pillar RGP1 in the first reflective group RG1 and the second reflective pillar RGP2 in the second reflective group RG2 immediately adjacent thereto.

The openings OP may be respectively provided in areas adjacent to the reflective pillars 200. For example, the openings OP may be respectively provided adjacent to the front surfaces (210e of FIGS. 1 to 3) of the reflective pillars 200. The openings OP may not overlap the reflective pillars 200 in the third direction DR3.

In the present disclosure, a floating image may be generated by using light emitted to the outside of the reflective pillars 200 through the upper surfaces (210a of FIGS. 1 to 3) of the reflective pillars 200 and light emitted to the outside of the reflective pillars 200 through the front surfaces (210e of FIGS. 1 to 3) of the reflective pillars 200. Accordingly, the reflective structure array 20 having high efficiency may be provided.

The light blocking layer 300 of the present disclosure may selectively block light that does not travel toward the bottom surfaces (210b of FIGS. 1 to 3) and the front surfaces (210e of FIGS. 1 to 3) of the reflective pillars 200. Accordingly, the generation of a direct image may be prevented.

Figure 23:
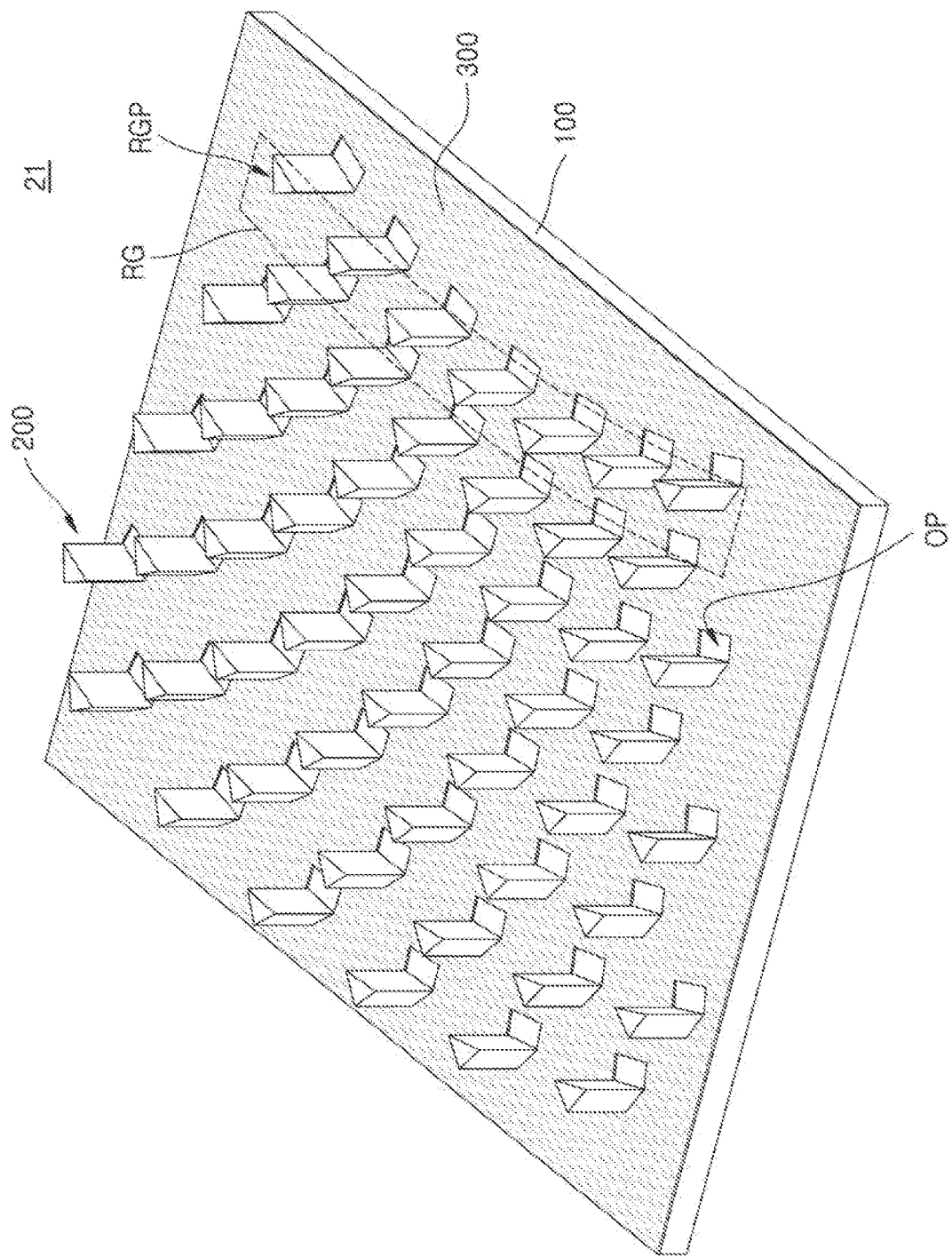
FIG. 23 is a diagram illustrating an overall shape of a reflective structure array according to an example embodiment.
Figure 24:
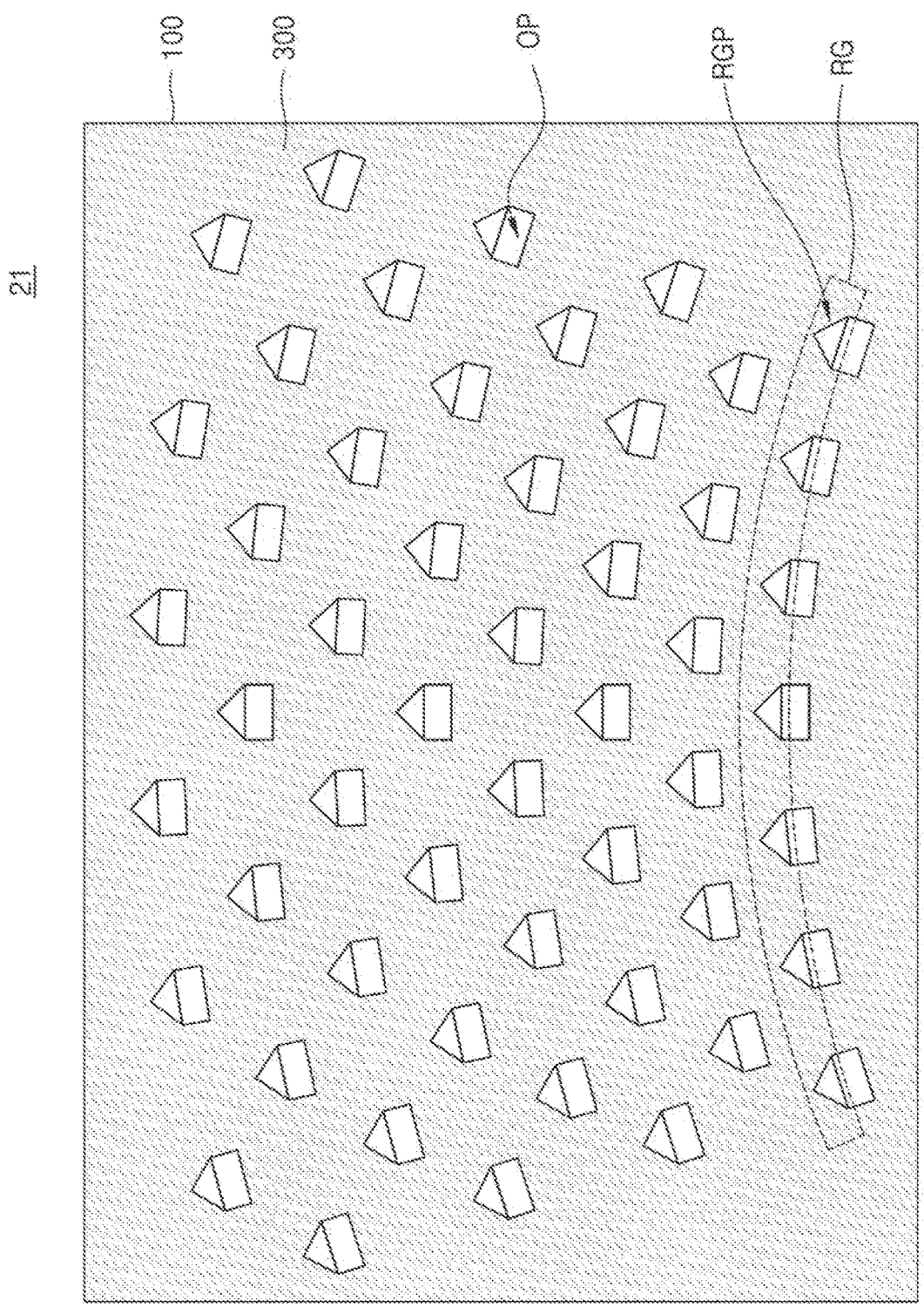
FIG. 24 is a plan view of the reflective structure of FIG. 23.

FIG. 23 is a diagram illustrating an overall shape of a reflective structure array according to an example embodiment. FIG. 24 is a plan view of the reflective structure of FIG. 23. For brevity of explanation, substantially the same descriptions as provided above with reference to FIGS. 1 to 3 may be omitted.

Referring to FIGS. 23 and 24, a reflective structure array 21 may be provided. The reflective structure array 21 may include a substrate 100, a light blocking layer 300 including a plurality of openings OP, and a plurality of reflective pillars 200. The reflective structure array 21 may be substantially the same as the reflective structure 10 described above with reference to FIGS. 1 to 3, except that the openings OP and the reflective pillars 200 are provided. However, in another example, the reflective structure array 21 may be an array of at least one of the reflective structures 11, 12, 13, 14, and 15 described above. Hereinafter, the arrangement of the openings OP and the reflective pillars 200 will be described.

The reflective pillars 200 may be radially arranged. The reflective pillars 200 may include a plurality of reflective groups RG spaced apart from a virtual point by different distances. One reflective group RG may include reflective pillars RGP spaced apart from the virtual point by the same distance. The reflective pillars RGP in one reflective group RG may be arranged along a virtual arc centering on the virtual point. For example, the distance between the reflective pillars 200 may be equal to or less than twice the height of the reflective pillars 200. For example, the distance between the front surfaces of the reflective pillars 200 may be equal to or greater than 0.3 times the height of the reflective pillars 200.

The openings OP may be respectively provided in areas adjacent to the reflective pillars 200. For example, the openings OP may be respectively provided adjacent to the front surfaces (210e of FIGS. 1 to 3) of the reflective pillars 200. The openings OP may not overlap the reflective pillars 200 in the third direction DR3.

The present disclosure may provide the reflective structure array 21 having high efficiency. The present disclosure may provide the reflective structure array 21 that generates a floating image with high sharpness by preventing a direct image from being generated.

Figure 25:
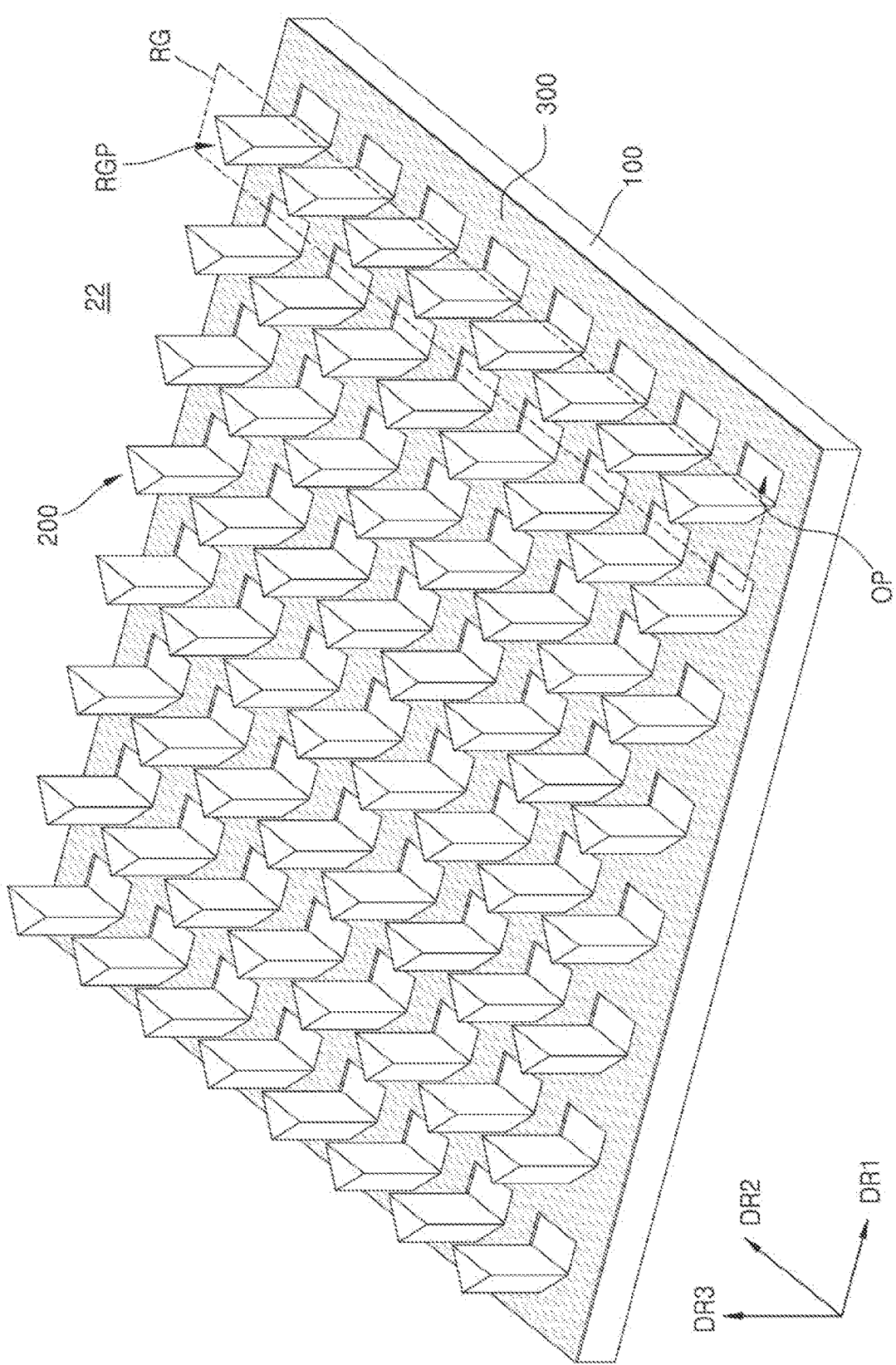
FIG. 25 is a diagram illustrating an overall shape of a reflective structure array according to an example embodiment.
Figure 26:
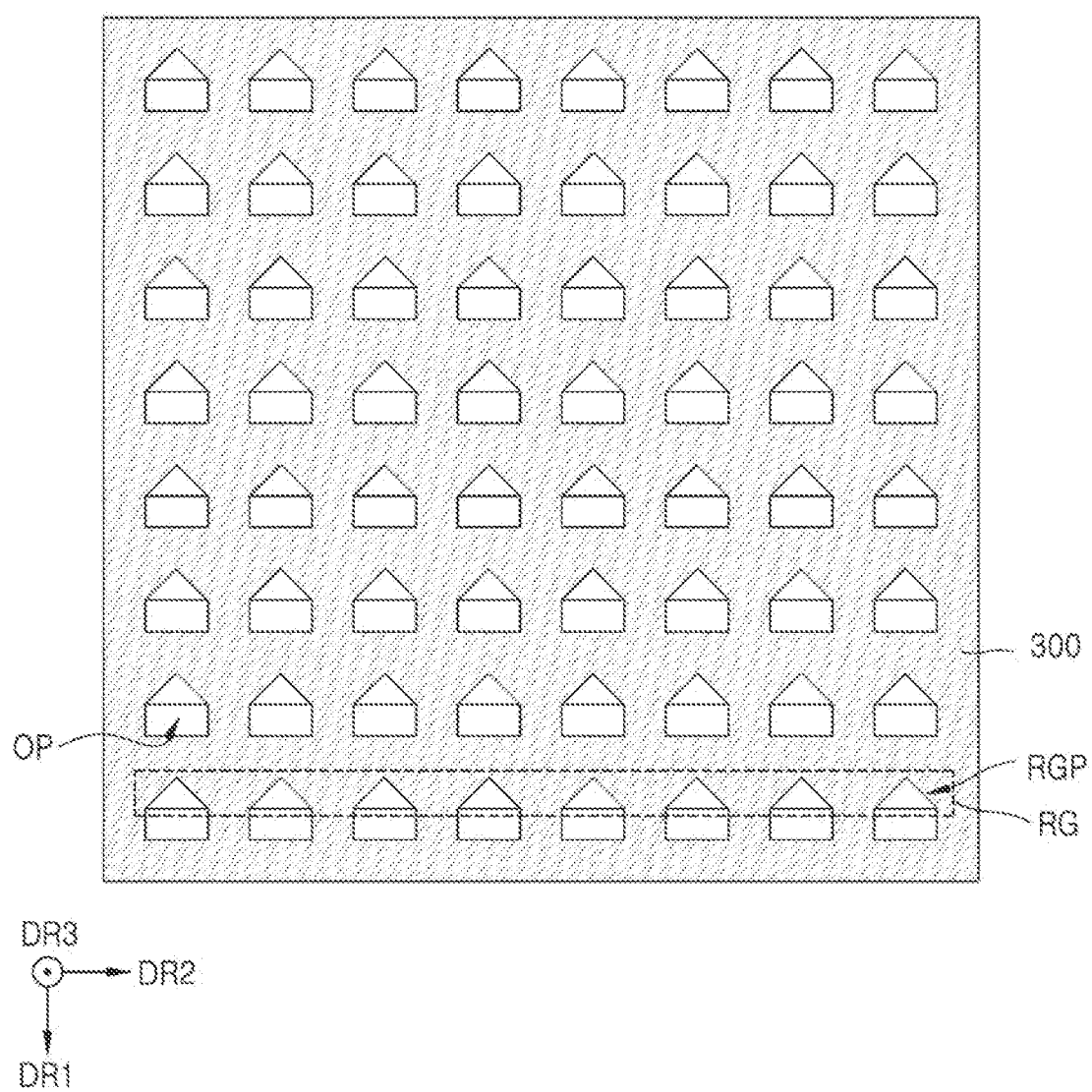
FIG. 26 is a plan view of the reflective structure of FIG. 25.

FIG. 25 is a diagram illustrating an overall shape of a reflective structure array according to an example embodiment. FIG. 26 is a plan view of the reflective structure of FIG. 25. For brevity of explanation, substantially the same descriptions as provided above with reference to FIGS. 1 to 3 may be omitted.

Referring to FIGS. 25 and 26, a reflective structure array 22 may be provided. The reflective structure array 22 may include a substrate 100, a light blocking layer 300 including a plurality of openings OP, and a plurality of reflective pillars 200. The reflective structure array 22 may be substantially the same as the reflective structure 10 described with reference to FIGS. 1 to 3, except that the openings OP and the reflective pillars 200 are provided. However, in another example, the reflective structure array 22 may be an array of at least one of the reflective structures 11, 12, 13, 14, and 15 described above. Hereinafter, the arrangement of the openings OP and the reflective pillars 200 will be described.

The reflective pillars 200 may be arranged in the first direction DR1 and the second direction DR2. For example, the reflective pillars 200 may be arranged at regular intervals. In the present disclosure, the minimum distance between the reflective pillars 200 may be the distance between a pair of reflective pillars RGP immediately adjacent to each other in the first direction DR1 or the distance between a pair of reflective pillars RGP immediately adjacent to each other in the second direction DR2. For example, the distance between the reflective pillars 200 may be equal to or less than twice the height of the reflective pillars 200. For example, the distance between the front surfaces of the reflective pillars 200 may be equal to or greater than 0.3 times the height of the reflective pillars 200.

The reflective pillars 200 may include a plurality of reflective groups RG arranged in the first direction DR1. The reflective groups RG may each include reflective pillars RGP arranged in the second direction DR2. For example, the reflective pillars RGP may be arranged at regular intervals. The reflective pillars RGP in the different reflective groups RG may overlap each other in the second direction DR2.

The openings OP may be respectively provided in areas adjacent to the reflective pillars 200. For example, the openings OP may be respectively provided adjacent to the front surfaces (210e of FIGS. 1 to 3) of the reflective pillars 200. The openings OP may not overlap the reflective pillars 200 in the third direction DR3.

The present disclosure may provide the reflective structure array 22 having high efficiency. The present disclosure may provide the reflective structure array 22 that generates a floating image with high sharpness by preventing a direct image from being generated.

Figure 27:
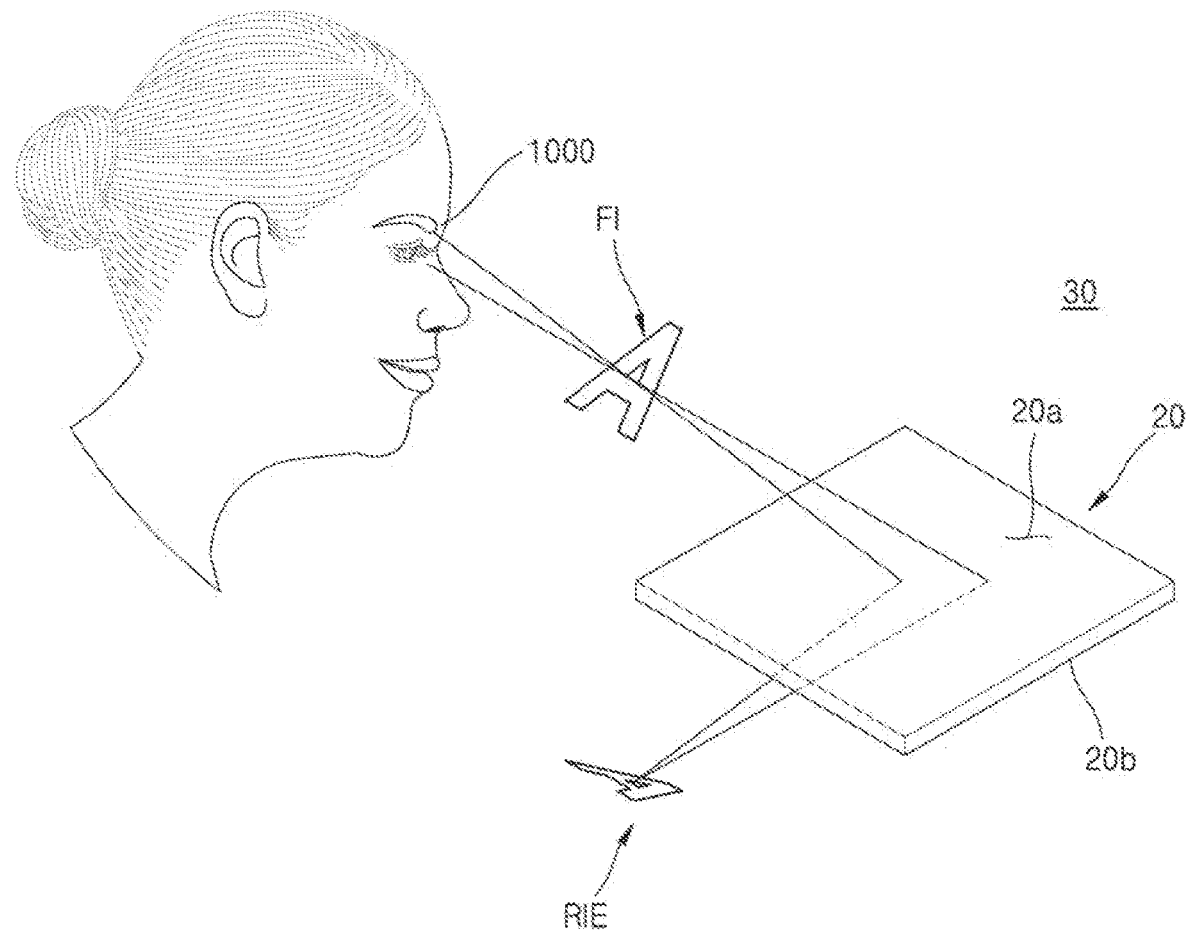
FIG. 27 is a conceptual diagram of a floating image display device according to an example embodiment.

FIG. 27 is a conceptual diagram of a floating image display device according to an example embodiment. For brevity of explanation, substantially the same descriptions as provided above with reference to FIGS. 21 to 26 may be omitted.

Referring to FIG. 27, a floating image display device 30 may be provided. The floating image display device 30 may include a reflective structure array 20 and a real image element RIE. The reflective structure array 20 may be the reflective structure array 20 described with reference to FIGS. 21 and 22. However, the present disclosure is not limited thereto. In another example, the reflective structure array 20 may be the reflective structure array 21 described with reference to FIGS. 23 and 24 or the reflective structure array 22 described with reference to FIGS. 25 and 26.

The real image element RIE may be disposed on one side of the reflective structure array 20. For example, the real image element RIE may be disposed on the second surface 100b of the substrate 100 in the reflective structure array 20. The real image element RIE may emit light that generates a real image. For example, the real image element may include a real object or a display device that outputs an image. Light emitted from the real image element RIE may be reflected by the reflective structure array 20. The light reflected from the reflective structure array 20 may generate a floating image FI on the other side of the reflective structure array 20.

When a user 1000 of the floating image display device 30 may see the floating image by seeing the reflective structure array 20 from the opposite side of the reflective structure array 20 with respect to the floating image FI.

The floating image display device 30 of the present disclosure may generate the floating image.

The description of embodiments of the technical idea of the present disclosure provides an example for the description of the technical idea of the present disclosure. Therefore, the technical idea of the present disclosure is not limited to the above embodiments, and it is apparent to those of ordinary skill in the art that various modifications and changes may be made thereof by combining the embodiments.

What is claimed is:

1. A reflective structure comprising:
 a substrate comprising a first surface and a second surface opposite to the first surface;
 a reflective pillar provided on the first surface of the substrate; and
 a first light blocking layer covering the first surface of the substrate,
 wherein the first light blocking layer comprises an opening adjacent to the reflective pillar and exposing a portion of the first surface of the substrate.

2. The reflective structure of claim 1, wherein the reflective pillar comprises:
 a first reflective side surface;
 a second reflective side surface perpendicular to the first reflective side surface; and
 a front surface extending between the first reflective side surface and the second reflective side surface.

3. The reflective structure of claim 2, wherein the front surface is planar, and
 wherein the reflective pillar has a triangular prism shape.

4. The reflective structure of claim 2,
 wherein the opening is adjacent to the front surface.

5. The reflective structure of claim 2, further comprising a second light blocking layer provided on an upper surface, the first reflective side surface, and the second reflective side surface of the reflective pillar.

6. The reflective structure of claim 2, further comprising a second light blocking layer provided on an upper surface of the reflective pillar.

7. The reflective structure of claim 2, wherein an aspect ratio of the reflective pillar is in a range of 0.6 to 3.5, and
 wherein the aspect ratio of the reflective pillar is determined by the following equation:

$$\text{aspect ratio} = (\text{height of the reflective pillar})/(\text{width of the first reflective side surface}).$$

8. The reflective structure of claim 1, further comprising a second light blocking layer provided between a bottom surface of the reflective pillar and the substrate.

9. A reflective structure array comprising:
 a substrate;
 a plurality of reflective pillars provided on the substrate; and
 a first light blocking layer covering a first surface of the substrate,
 wherein the first light blocking layer comprises a plurality of openings exposing portions of the first surface of the substrate, and each opening of the plurality of openings is adjacent to a corresponding reflective pillar of the plurality of reflective pillars, and
 wherein the plurality of reflective pillars and the plurality of openings immediately adjacent to each other are arranged in a first direction parallel to the first surface of the substrate.

10. The reflective structure array of claim 9, wherein a distance between adjacent reflective pillars of the plurality of reflective pillars is equal to or less than twice a height of each of the plurality of reflective pillars.

11. The reflective structure array of claim 9, wherein each of the plurality of reflective pillars comprises:
 a first reflective side surface;
 a second reflective side surface perpendicular to the first reflective side surface; and
 a front surface extending between the first reflective side surface and the second reflective side surface, and
 wherein a distance between the front surfaces of adjacent reflective pillars of the plurality of reflective pillars is equal to or greater than 0.3 times a height of each of the plurality of reflective pillars.

12. The reflective structure array of claim 11, wherein the front surface is planar, and
 wherein each reflective pillar of the plurality of reflective pillars has a triangular prism shape.

13. The reflective structure array of claim 11, further comprising a second light blocking layer provided on an upper surface, the first reflective side surface, and the second reflective side surface of each reflective pillar of the plurality of reflective pillars.

14. The reflective structure array of claim 11, wherein the plurality of reflective pillars are provided on the first surface of the substrate, and
  wherein each opening of the plurality of openings is adjacent to the front surface of the corresponding reflective pillar of the plurality of reflective pillars.

15. The reflective structure array of claim 11, further comprising a second light blocking layer provided on an upper surface of each reflective pillar of the plurality of reflective pillars.

16. The reflective structure array of claim 9, wherein the plurality of reflective pillars comprise a plurality of first reflective groups arranged in the first direction, and
  wherein the plurality of first reflective groups each comprise a plurality of first reflective pillars arranged in a second direction parallel to the first surface and crossing the second direction.

17. The reflective structure array of claim 9, wherein the plurality of reflective pillars are provided on the first surface of the substrate.

18. The reflective structure array of claim 9, further comprising a second light blocking layer provided between a bottom surface of each reflective pillar of the plurality of reflective pillars and the substrate.

19. A floating image display device comprising:
  a real image element configured to output light that generates a real image; and
  a reflective structure array configured to generate a floating image by reflecting the light output from the real image element,
  wherein the reflective structure array comprises:
  a substrate;
  a plurality of reflective pillars provided on the substrate; and
  a first light blocking layer covering a first surface of the substrate, the first light blocking layer comprising a plurality of first openings exposing portions of the first surface of the substrate, and each first opening of the plurality of first openings is adjacent to a corresponding reflective pillar of the plurality of reflective pillars, and
  wherein the plurality of reflective pillars and the plurality of first openings are arranged in a first direction parallel to the first surface.

20. The floating image display device of claim 19, wherein each of the plurality of reflective pillars comprises:
  a first reflective side surface;
  a second reflective side surface perpendicular to the first reflective side surface; and
  a front surface extending between the first reflective side surface and the second reflective side surface.

\* \* \* \* \*